(12) United States Patent
Jayawardena et al.

(10) Patent No.: US 11,477,163 B2
(45) Date of Patent: Oct. 18, 2022

(54) SCRUBBED INTERNET PROTOCOL DOMAIN FOR ENHANCED CLOUD SECURITY

(71) Applicant: AT&T Intellectual Property I, L.P., Atlanta, GA (US)

(72) Inventors: Thusitha Jayawardena, Holmdel, NJ (US); Christopher Van Wart, Ocean, NJ (US); Leonard Russo, Middletown, NJ (US); Nicholas Arconati, St. Louis, MO (US); Robert Chin, South Plainfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 413 days.

(21) Appl. No.: 16/551,059

(22) Filed: Aug. 26, 2019

(65) Prior Publication Data

US 2021/0067489 A1    Mar. 4, 2021

(51) Int. Cl.
*H04L 29/06*    (2006.01)
*H04L 9/40*    (2022.01)
*H04L 67/1097*    (2022.01)
*G06F 9/455*    (2018.01)

(52) U.S. Cl.
CPC ...... *H04L 63/0236* (2013.01); *G06F 9/45558* (2013.01); *H04L 63/0263* (2013.01); *H04L 63/1425* (2013.01); *H04L 67/1097* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 10,587,637 B2* | 3/2020 | Hu | H04L 43/028 |
| 10,616,251 B2* | 4/2020 | Savalle | H04L 63/1425 |
| 2015/0207706 A1* | 7/2015 | Li | H04L 63/1458 709/224 |
| 2016/0036837 A1* | 2/2016 | Jain | H04L 63/1416 726/23 |
| 2016/0036838 A1* | 2/2016 | Jain | H04L 63/1416 726/23 |
| 2016/0182542 A1* | 6/2016 | Staniford | H04L 63/1416 726/23 |
| 2017/0111396 A1* | 4/2017 | Chesla | H04L 63/1483 |

(Continued)

*Primary Examiner* — Jeffery L Williams
(74) *Attorney, Agent, or Firm* — Hartman & Citrin LLC

(57) ABSTRACT

Concepts and technologies directed to scrubbed internet protocol domain for enhanced cloud security are disclosed herein. In various aspects, a system can include a processor and memory storing instructions that, upon execution, cause performance of operations. The operations can include exposing an application to a service provider network that provides an internet connection, where the application is provided by a datacenter that communicates with the service provider network. The operations can include monitoring traffic flows to the application during an observation time period, where the traffic flows include probe traffic that attempts to reach the application. The operations can include constructing a scrubbed internet protocol domain such that detected probe traffic is prevented from reaching a plurality of virtual machines provided by the datacenter.

18 Claims, 10 Drawing Sheets

(56) References Cited

U.S. PATENT DOCUMENTS

| | | | |
|---|---|---|---|
| 2017/0237838 A1* | 8/2017 | Vandevoorde | H04W 56/0015 |
| | | | 370/350 |
| 2018/0013787 A1* | 1/2018 | Jiang | H04L 45/64 |
| 2018/0020002 A1* | 1/2018 | Duca | G06F 21/572 |
| 2018/0032399 A1* | 2/2018 | Johnson | G06F 11/2033 |
| 2018/0101371 A1* | 4/2018 | Flanakin | G06F 8/34 |
| 2018/0150256 A1* | 5/2018 | Kumar | G06F 8/654 |
| 2018/0278646 A1* | 9/2018 | Tu | H04L 29/06 |
| 2018/0302436 A1 | 10/2018 | Williamson et al. | |
| 2021/0067489 A1* | 3/2021 | Jayawardena | H04L 63/0236 |

\* cited by examiner

SCRUBBED INTERNET PROTOCOL DOMAIN FOR ENHANCED CLOUD SECURITY

BACKGROUND

In some datacenters, the physical host networking devices may be distributed across various locations. Through virtualized network architecture, the physical host networking devices can provide a virtual datacenter that appears cohesive to a user data plane. Communication service providers can implement network virtualization platforms to share virtualized infrastructure that supports multiple communication services and network applications (including real-time and non-real-time applications). Due to the increased adoption of cloud services, additional physical host networking devices may be added to facilitate and support the various virtualized and/or non-virtualized computing services. In some instances, at least some network traffic in datacenters can occur internally, that is, between virtual machines and/or host devices that are included within the datacenter. Some systems for distributed computing environments may be at least partially exposed to the Internet, and in turn may receive requests to handle various traffic. In some instances, the traffic may be nefarious, unknown, and/or otherwise unwanted, and may consume computing resources of the datacenter. Moreover, the prevalence of shifting processing to a datacenter may increase the volume of incoming data on an exponential scale, which may cause computing systems to become burdened and/or operate inefficiently.

SUMMARY

The present disclosure is directed to a scrubbed internet protocol domain for enhanced cloud security. According to one aspect of the concepts and technologies disclosed herein, a system is disclosed. In some embodiments, the system can include a processor and a memory. In some embodiments, the system can be provided by an application server, a computer system of a service provider network, and/or a computer system of a datacenter. The memory can store computer-executable instructions that, when executed by the processor, cause the processor to perform operations. In some embodiments, the operations can include exposing an application to a service provider network that provides an internet connection, where the application can be provided (hosted, supported, and/or otherwise executed) by a datacenter that communicates with the service provider network. In some embodiments, the operations can also include monitoring traffic flows to the application during an observation time period, where the traffic flows include probe traffic that attempts to reach the application, where the probe traffic may attempt to reach the application in response to exposure to the service provider network. In some embodiments, the probe traffic may attempt to reach a plurality of end-points in a datacenter, where the end-points can include virtual machines and/or containers that exist and/or execute on datacenter infrastructure. Attempts to reach the application can include the traffic flow attempting to communicate with the application, such as by sending data packets, requesting a response, an acknowledgement, and/or attempting to discover any information about the application and/or a publicly routable internet protocol address associated with the application. The application can be publicly routable and globally reachable via the internet connection, where the probe traffic can be permitted to be routed through one or more firewalls so as to reach the application, and thus the traffic flow can be received by the application (such as by a traffic flow being received by the application). In some embodiments, the application can be isolated and execute within a sandbox of a datacenter, and the application may be instantiated prior to any other virtual machines and/or virtual tenant applications being assigned a publicly routable internet protocol address. The traffic flows, including the probe traffic flows, can be unsolicited such that an application may not initiate a request to engage with a device that provided the traffic flow. In some embodiments, the operations can also include constructing a scrubbed internet protocol domain such that detected probe traffic is prevented from reaching a plurality of virtual machines provided by the datacenter, where constructing the scrubbed internet protocol domain includes scrubbing the detected probe traffic from the service provider network and the datacenter. In some embodiments, the scrubbed internet protocol domain can include a plurality of publicly routable internet protocol addresses that can be advertised via the internet connection while being protected from the detected probe traffic. The plurality of publicly routable internet protocol addresses can be advertised by being globally exposed via the internet connection while one or more virtual machines associated the plurality of publicly routable internet protocol addresses are protected from, and therefore cannot be reached by, the detected probe traffic.

In some embodiments, the operations can also include generating a scrubbing scheme so as to stagger, cascade, and/or distribute scrubbing of the detected probe traffic across the service provider network and the datacenter. In some embodiments, the operations can also include distributing the scrubbing scheme to designated scrubbing points within the service provider network and the datacenter. In some embodiments, the operations can also include maintaining the scrubbed internet protocol domain by identifying and discarding inactive filtering rules at designated scrubbing points within the service provider network and the datacenter. In some embodiments, the designated scrubbing points can include at least one of a carrier-grade router, an access router, a virtual router, or a cloud gateway. In some embodiments, one or more of the scrubbing points (e.g., any of the carrier-grade router, the access router, the virtual router, and/or the cloud gateway) can include a firewall. In some embodiments, the operations can also include instructing the service provider network to automatically allow the traffic flows to be routed to the application during the observation time period. In some embodiments, any and/or all traffic flows that target the application can be routed through a firewall and reach the application during the observation time period. In some embodiments, the operations can also include withdrawing exposure of the application to the service provider network in response to the observation time period elapsing. In some embodiments, the observation time period can be set so as to be restarted and/or reinitiated following reporting of information and records about monitored traffic flows, and therefore monitoring the traffic flows reaching the application can occur continuously, periodically, and/or aperiodically. In some embodiments, the application may respond to and/or record various requests in traffic flows (e.g., probe traffic and/or in valid traffic flows). In some other embodiments, all traffic flows that reach and/or attempt to reach the application can be recorded without the application responding to one or more (and/or any) requests from probing traffic and/or valid traffic that are included in the traffic flows.

According to another aspect of the concepts and technologies disclosed herein, a method is disclosed, according to an embodiment. The method can include exposing, by a system executing a processor, an application to a service provider network that provides an internet connection, where the application can be provided by a datacenter that communicates with the service provider network. In some embodiments, the method can also include monitoring, by the processor, traffic flows to the application during an observation time period, where the traffic flows include probe traffic that attempts to reach the application in response to exposure to the service provider network. In some embodiments, the method can also include constructing, by the processor, a scrubbed internet protocol domain such that detected probe traffic is prevented from communicating with a plurality of virtual machines provided by the datacenter, where constructing the scrubbed internet protocol domain includes scrubbing the detected probe traffic from the service provider network and the datacenter. In some embodiments, the scrubbed internet protocol domain can include a plurality of publicly routable internet protocol addresses that can be advertised via the internet connection while being protected from the detected probe traffic.

In some embodiments, the method can also include generating, by the processor, a scrubbing scheme so as to stagger scrubbing of the detected probe traffic across the service provider network and the datacenter. In some embodiments, the method can also include distributing the scrubbing scheme to designated scrubbing points within the service provider network and the datacenter. In some embodiments, the datacenter can include one or more datacenter networks that are provide communicative coupling to infrastructure within a datacenter and/or between two or more datacenters. In some embodiments, the method can also include maintaining, by the processor, the scrubbed internet protocol domain by identifying and discarding inactive filtering rules at designated scrubbing points within the service provider network and the datacenter. In some embodiments, the designated scrubbing points can include at least one of a carrier-grade router, an access router, a virtual router, or a cloud gateway. In some embodiments, the method can also include instructing, by the processor, the service provider network to automatically allow the traffic flows to be routed to the application during the observation time period. In some embodiments, the method can also include withdrawing, by the processor, exposure of the application to the service provider network in response to the observation time period elapsing.

According to yet another aspect, a computer storage medium is disclosed. The computer storage medium can have computer-executable instructions stored thereon. When the computer-executable instructions are executed by a processor, the processor can perform operations. In some embodiments, the processor can be included in and/or provided by a computer system of a datacenter and/or a service provider network. In some embodiments, the operations can include exposing an application to a service provider network that provides an internet connection, where the application can be provided by a datacenter that communicates with the service provider network. In some embodiments, the operations can also include monitoring traffic flows to the application during an observation time period, where the traffic flows include probe traffic that attempts to reach the application in response to exposure to the service provider network. In some embodiments, the operations can also include constructing a scrubbed internet protocol domain such that detected probe traffic is prevented from reaching a plurality of virtual machines provided by the datacenter, where constructing the scrubbed internet protocol domain includes scrubbing the detected probe traffic from the service provider network and the datacenter. In some embodiments, the scrubbed internet protocol domain can include a plurality of publicly routable internet protocol addresses that can be advertised via the internet connection while being protected from the detected probe traffic.

In some embodiments, the operations can also include generating a scrubbing scheme so as to stagger, cascade, and/or distribute scrubbing of the detected probe traffic across the service provider network and the datacenter. In some embodiments, the operations can also include distributing the scrubbing scheme to designated scrubbing points within the service provider network and the datacenter. In some embodiments, the operations can also include maintaining the scrubbed internet protocol domain by identifying and discarding inactive filtering rules at designated scrubbing points within the service provider network and the datacenter. In some embodiments, the designated scrubbing points can include at least one of a carrier-grade router, an access router, a virtual router, or a cloud gateway. In some embodiments, the operations can also include instructing the service provider network to automatically allow the traffic flows to be routed to the application during the observation time period. In some embodiments, the operations can also include withdrawing exposure of the application to the service provider network in response to the observation time period elapsing.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
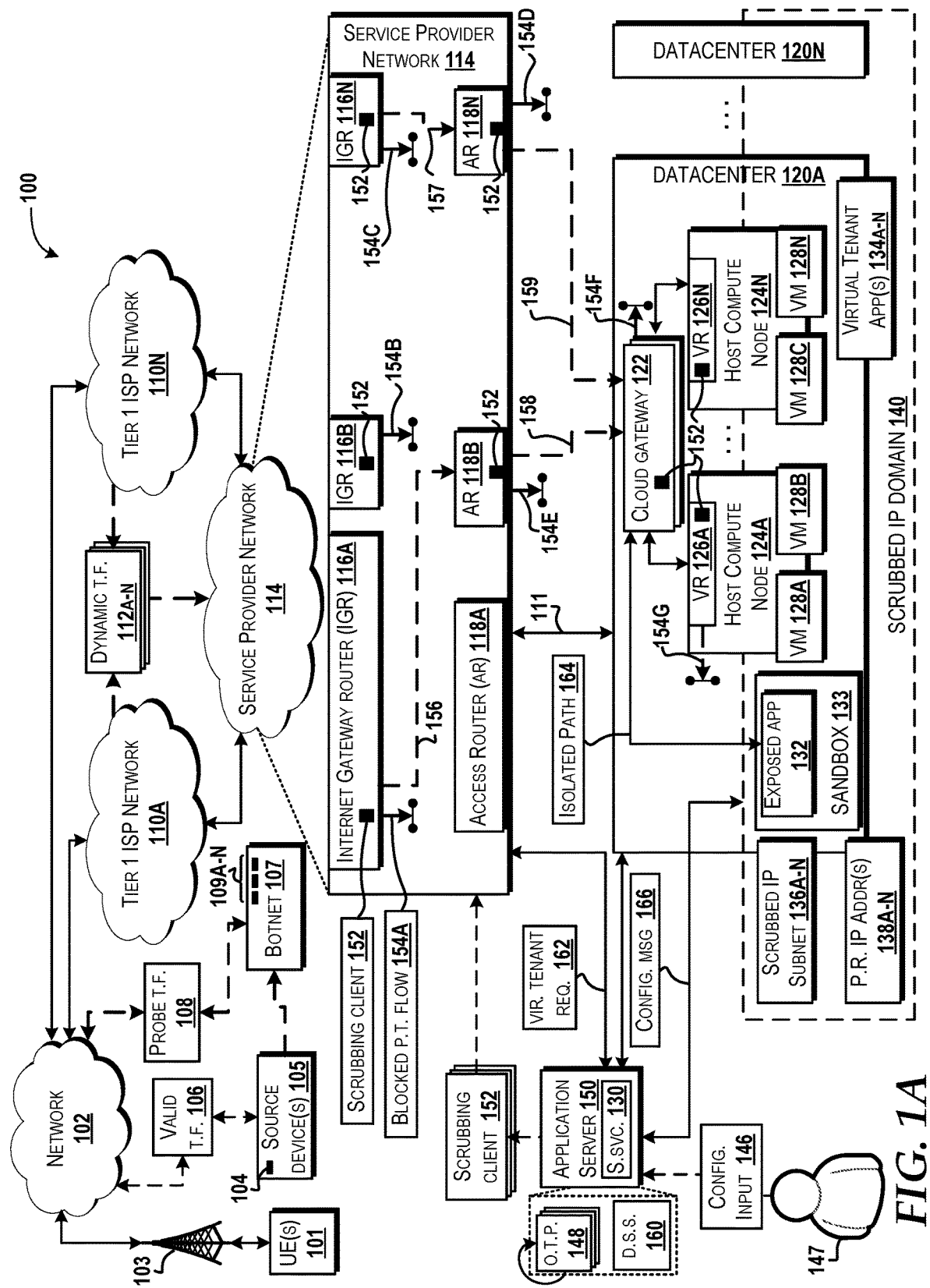
FIG. 1A is a block diagram illustrating an example operating environment in which aspects of a scrubbed internet protocol domain for enhanced cloud security can be implemented, according to an illustrative embodiment.

The following detailed description is directed to a scrubbed internet protocol ("IP") domain for enhanced cloud computing security, according to various embodiments. Service providers are increasingly adopting cloud platforms for providing various virtualized services. Due to the elastic nature of cloud computing platforms, adequate computing and networking resources that are used to meet fluctuating demand of a service may be automatically and/or dynamically matched to virtualized services that request utilization. For example, virtual machines and/or virtual containers can be spun up and/or spun down (i.e., instantiated and/or purged) to match the variable service demand at one or more host compute nodes within one or more datacenter. The dynamic aspects of cloud computing can provide technical advantages compared to solely using hardware platforms to satisfy demand. However, the use of virtualized resources can introduce technical challenges that—if left unattended, unaddressed, and/or unresolved—can decrease performance and/or resource efficiency within a datacenter and/or network. For example, aspects of cloud computing and hosting various virtualized services can entail ensuring that the computing resources are serving valid service demand, but not serving resource demand from malicious and/or otherwise invalid service requests, such as from probe traffic flows. Therefore, a technical challenge specifically arising within the realm of cloud computing can arise when a virtual service (e.g., a virtual tenant application and/or service executing on a virtual machine and/or container) is accessed and/or advertised via an Internet connection because such a virtualized service can be continuously bombarded by a barrage of probing traffic (e.g., unsolicited traffic flows) including various types of malicious traffic originating from automated botnets. As such, aspects of the present disclosure can prevent malicious and/or invalid service requests (e.g., caused and/or found in probe traffic flows) from reaching, communicating, accessing, and/or consuming cloud computing and/or networking resources while continuing to expose and allow publicly routable internet protocol addresses to be globally advertised via the Internet connection. In various embodiments, one or more system discussed herein can include a Virtual Network Function ("VNF"), a Virtual Machine ("VM"), and/or a virtual container.

In various instances, any application, service, website, and/or cloud resource that is accessed from the Internet traditionally faces a barrage of continuous probing from malicious botnet and/or sweeping scripts that track IP addresses. In most instances, the intent of these probes can include attempts at finding exploitable vulnerabilities and mapping networks for future attacks. Various service providers, cloud hosts, and/or network administrators may consider this to be malicious activity that may create acute negative effects, specifically when the probing is directed at cloud applications, services, and/or infrastructure. In some instances, other negative effects can slow down cloud application on-boarding by complicating application-specific security rule construction, while also consuming network resources that would otherwise have handled legitimate network traffic. Thus, in some instances, probing mitigation can include the implementation of firewalls and/or cloud security groups to filter out this probe traffic as much as possible before it reaches any virtual machine and/or container end-points that provide the cloud service and/or application.

In some environments, probe traffic may reach, and/or attempt to reach, an Internet-facing virtual machine (i.e., a virtual machine and/or application that is associated with a publicly routable, global internet protocol address), but security groups and/or a localized application security policy at the virtual machine and/or container may be the only stage that provides (and thus is the full extent of) filtering to remove and/or deny the probing traffic. However, some firewall and security groups are limited in their ability to filter probe traffic before the probe traffic flow reaches the end-points (e.g., the virtual machine and/or container that supports the cloud service and/or application). There are several reasons for this. For example, traditional firewall and security group rules are static and thus may not adequately filter probe traffic that is dynamic. Additionally, because the probe traffic is typically originated from automated scripts and/or botnets, an attacker (e.g., a nefarious device) may be able to evade static filtering configurations by changing the attributes and/or parameters of the traffic flow, such as by the nefarious device using a virtual private network that masks the true source IP address, and/or obtaining another source IP address to mask the identity and/or nature of the probe traffic. For example, the attacker could automatically adjust attributes such as originating geographic location, source IP addresses, and/or protocols and traffic volumes based on predefined parameter values and/or prefixes. In some instances, botnets and any other nefarious services (e.g., services that can provide DDOS attacks and/or services that generate probe requests) can be available for rent and/or for hire, and therefore the implementation and use of probing traffic through different botnet services makes it more accessible for an attacker to use different botnets over time, thereby evading static and/or manual attempts to protect a network. In some instances, botnets may include several thousand to hundreds of thousands of bots that generate instances of probe traffic in an attempt to attack a network, device, application, and/or service. Firewalls and security groups that rely only on manual and/or static configuration to guard against probe traffic may not effectively identify the dynamically changing probe traffic which can correspond to a vast number of individual botnet sources. In various embodiments, probe traffic flows may not request information from and/or about a target (e.g., an application, a host, a datacenter, a network node, a network, etc.) without initiating, attempting, and/or causing an attack (e.g., a DDOS attack) on the target device, network, datacenter, and/or scrubbed IP domain. When the probe traffic is originated from a non-authentic source (e.g., a malicious source, such as a botnet), then the varying number of inauthentic source IP addresses (which may be referred to as a malicious source IP address) corresponding to the bots (and probe traffic) may not be recognized using conventional approaches.

Additionally, the issue of undesirable probe traffic may not only be a nuisance on hardware resources, but within a cloud environment, the probe traffic has the potential to become a major resource bottleneck. In some instances, computing resources may be provided by instances of common-off-the-shelf hardware. As such, computing resources can be at a premium because datacenter infrastructure that provides the cloud resources may be shared among multiple tenants. Probe traffic can also cause technical challenges because packet captures used for troubleshooting various network issues may contain vast amounts of extraneous probe traffic, and therefore can increase the consumption of compute resources in order to analyze the increased amount of packet captures. Additionally, processor cycles and/or other network resources within the datacenter may be wasted on attempting to discard probe traffic at a firewall protecting a virtual machine and/or container. In turn, the increased amount of probe traffic dropped at the firewall can cause firewall logs to be inundated with entries that do not reveal the true identity of the source IP address, and therefore can potentially mask important warnings and/or other indicators. The entries may not reveal an accurate, real, and/or true identity of the source IP address and/or source device. For example, the probe traffic may be used by a nefarious device to mask targeted attacks against a datacenter and/or virtual machine, but such attacks may be undetected because traditional mechanisms for handling probe traffic may overwhelm the compute resources.

Traditional mechanisms for handling probe traffic may also cause other undesirable issues. For example, in some instances, network administrators may prohibit a virtual tenant from implementing an "allow all traffic" security policy for an application, a service, and/or another operation accessible via the datacenter that provides the cloud infrastructure. The configuration of "allow all traffic" may be prohibited by a network administrator because the exposed application and/or service may receive a barrage of probe traffic that can potentially attempt to implement nefarious actions, such as the installation of malware. As such, the probe traffic can slow down the on-boarding process for hosting virtual tenants, and therefore cause the compute resources to operate inefficiently and/or otherwise negatively impact the overall hardware, software, and/or firmware development lifecycle.

Concepts and technologies of the present disclosure can provide a scrubbed IP domain that can support the utilization of a datacenter that is free of and/or otherwise has a substantially reduced amount of probe traffic that reaches a virtual machine and/or a container. In various embodiments, the scrubbed IP domain can be established and/or maintained by a scrubbing service that may be offered by a communication service provider. The scrubbing service can scrub, and thus filter out, probe traffic targeting virtual tenant applications which are hosted by virtual machines of one or more datacenter. The scrubbing service can utilize machine learning and detect dynamic probe traffic so as to categorize the various probe traffic flows and enable dropping of the detected probe traffic at different points along one or more network paths within a service provider network and/or datacenter. The scrubbed IP domain can be constructed and maintained through implementation of a distributed, dynamic scrubbing scheme that identifies designated scrubbing points within the service provider network and/or the datacenters that support the compute resources which provide the virtual machines that host the virtual tenant services and/or applications. The scrubbing scheme can define a cascading scrubbing sequence that can stagger, cascade, and/or distribute scrubbing (e.g., identifying the particular node that provides scrubbing) such that the detected probe traffic is scrubbed and dropped from a network path, specifically by indicating which of the designated scrubbing points should implement or otherwise activate particular dynamic filtering instructions at a particular time. By this, the detected probe traffic can be dropped without the nefarious attacking device anticipating which parameters will be used to filter probe traffic and where the scrubbing will occur, which can prevent the nefarious device from anticipating which network node within the service provider network and/or the datacenter is currently operating as a designated scrubbing node.

The scrubbing service can be applied across a service provider network and one or more instances of a datacenter, thereby allowing the dynamic distributed scrubbing scheme to be applied and implemented in a cohesive manner that is not readily predictable to botnets and/or automated IP sweepers that generate the probe traffic flows. As such, botnet probe traffic from botnets, automated IP sweepers, and/or any other nefarious entity can be isolated and dropped at different, staggered scrubbing points within a service provider network and a datacenter, where the designated scrubbing points may change dynamically and thus be implemented across a vast number of network devices. For example, in some embodiments, the designated scrubbing points that support and/or maintain the scrubbed IP domain can include, but should not be limited to, cloud gateway routers, virtual routers, carrier-grade routers (e.g., internet gateway routers that peer with a Tier 1 internet service provider network), access routers, virtual machine and/or container IP tables, and/or tenant firewalls.

The probe traffic may be detected based on information that is dynamically provided by one or more points within the service provider network and/or datacenter, such as traffic flow information that is available from a cloud gateway and/or virtual routers. In turn, the traffic flow records can be provided as input to a scrubbing engine that may implement one or more machine learning processes that are understood by one skilled in the technology. As such, a distributed scrubbing scheme can be generated and dynamically updated so as to enable detection of probe traffic and any other unwanted traffic flows (e.g., traffic flows that are misdirected due to error in human input and/or network failures). The distributed scrubbing scheme can provide dynamic instructions that indicate which filter rules should be discarded (e.g., certain inactive filter rules), along with how often (i.e., the time period) the purging of the filtering rules should occur, which can be based on one or more timers from various physical routers and/or virtual routers or other devices (e.g., switches, etc.) within the service provider network and/or instances of the datacenter. In various aspects, the scrubbed IP domain can enable virtual tenant applications to be on-boarded to a particular virtual machine (e.g., via allocation of resources from one or more host compute nodes) in a manner that can allow a more efficient utilization of resources. These and other aspects of the concepts and technologies disclosed herein will be illustrated and described in more detail below. In various embodiments discussed herein, the description may refer to virtual machines running on cloud platforms. However, it should be appreciated that the operations and aspects discussed herein can equally be applied to containers. Therefore, it is understood that the examples provided are for illustration purposes only, and therefore should not be construed as limiting in any way.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1A, aspects of an operating environment 100 for implementing various embodiments of the concepts and technologies disclosed herein for providing a scrubbed IP domain for enhanced cloud security will be described, according to an illustrative embodiment. The operating environment 100 shown in FIG. 1 includes a communications network ("network") 102 that is communicatively coupled to a network access point 103, one or more instances of a user equipment ("UE") 101, and a datacenter, such as datacenters 120A-N. It should be understood that the network 102 can include almost any type of computer networks as well as communications networks. The network 102 can be hosted, in part or in whole, by a communications service provider. The network 102 can include one or more of a radio access network, an evolved packet core network, a core network, an IP-based network, a transport network, an optical transport network, a circuit switched network, a mobile Wide Area Network, a combination thereof, or the like.

In some embodiments, the network 102 can communicate with a network access point, such as the network access point 103, which may be included in a radio access network, although this may not necessarily be the case in all embodiments. The network access point 103 can provide wired and/or wireless communicative coupling and can include, but should not be limited to, one or more of a base transceiver station, a wireless router, a femtocell, an eNodeB, a NodeB, a gNodeB (i.e., an access point that incorporates current and/or future access technology, such as LTE Advanced, New Radio standards, 5G protocols and technology, and/or other standards as understood by one of ordinary skill), a multi-standard metro cell node, a customer premise edge node (e.g., an optical network terminal), and/or other network nodes or combinations thereof that are capable of providing communication to and/or from the network 102. It should be understood that the examples provided are for illustration purposes only, and therefore should not be construed as limiting in any way.

In some embodiments, the operating environment 100 can include one or more instances of a user equipment, such as the UE 101. In various embodiments, instances of the network access point 103 can provide one or more devices (e.g., the UE 101) with communicative coupling and/or access to the network 102, other devices, and/or another network, such any network discussed herein. Instances of the UE 101 refers to any computer system and/or user equipment that can send and/or receive network communications, and thus generate (and/or otherwise trigger generation of) network traffic flows, which will be discussed below in further detail, that may be sent to and/or from and/or be handled by a network and/or network devices, such as but not limited to the network 102, Tier 1 Internet Service Provider ("ISP") networks 110A-N, a service provider network ("SPN") 114, and/or a datacenter, such as the datacenters 120A-N which will be discussed below in further detail. Embodiments of the UE 101 can include, but should not be limited to, a user equipment, a mobile communications device, a server, a desktop computer, a laptop computer, a tablet, a customer premise equipment, a switch, or other computing systems that can send and/or receive traffic flows via a network. It is understood that zero, one, or more than one instances of the UE 101 can be present within various embodiments of the operating environment 100. Further discussion of aspects of an embodiment of the UE 101 is provided below with respect to a computer system illustrated in FIG. 8.

In some embodiments, the operating environment 100 can include a source device 105 that generates and/or otherwise communicates instances of network traffic. In some embodiments, the source device 105 can be configured as an instance of the UE 101, and therefore can include one or more aspects discussed above. As such, the source device 105 refers to any computer system that can be executed to communicate with and/or otherwise access a network (e.g., the network 102) and generate network traffic flows, such as discussed below. For clarity purposes only, the source device 105 illustrated in FIG. 1A is configured as a computer system, and therefore can be configured according to an embodiment discussed below with respect to FIG. 8.

In various embodiments, a message, request, and/or any other communication can be generated and packetized into one or more data packets that are directed to a particular device, application, service, and/or another target that connects to a network, and therefore collectively form a traffic flow. As such, a traffic flow ("traffic") can traverse a network and can include and/or otherwise refer to the one or more data packets corresponding to a particular network communication that is addressed to and/or otherwise directed to a particular target (e.g., a datacenter, virtual machine, virtual application and/or service, a virtual network function, etc.). In various embodiments, traffic flows can include information and content that is to be conveyed, sent to, and/or requested from the intended target. In various embodiments, the traffic flows may include headers that provide access and identification information, such as a "5-tuple," that may be used to support routing and delivery of data packets For example, in some embodiments, a "5-tuple" can provide parameters and/or values such as a source IP address, a source port number, a destination IP address, destination port number, and a protocol identifier in use. In various embodiments, a traffic flow can provide values that conform to one or more technical standards and/or protocols, such as but not limited to values that support a Transmission Control Protocol/Internet Protocol ("TCP/IP") connection. It is understood that the examples provided herein are for illustration purposes only, and therefore should not be construed as limiting in any way.

In some embodiments, an instance of the source device 105 may function and/or perform operations that are valid, authentic, legitimate, and/or are otherwise not nefarious, and as such, any network traffic flow(s) generated by, corresponding to, and/or are otherwise associated with the source device 105 may be considered to be a valid network traffic flow, such as a valid traffic flow 106. In some embodiments, an instance of the valid traffic flow 106 may be referred to as an instance of "valid traffic." An instance of the valid traffic flow 106 can be an embodiment of the traffic flow discussed above, and as such, the valid traffic flow 106 may have access information included therein that is used to route, direct, handle, and/or identify the data packets and/or overall traffic flow instance (e.g., provided by the "5-tuple" discussed above). An instance of a traffic flow may be detected and determined to be valid, such as the valid traffic flow 106, (and thus is not considered to be a nefarious traffic flow, such as a traffic flow associated with a probe, a sweeper, a botnet, etc.) if the source information provided by traffic flow (e.g., a source IP address) matches the actual identity and/or source information corresponding to the source that generated and/or initiated the traffic flow (e.g., the IP address that actually corresponds to the source device 105). For example, the source device 105 may be assigned a source IP address 104 from which to send and/or receive communications, and as such, the source IP address 104 may be a valid, authentic IP address to identify the source device 105 as the source of traffic flows being sent and the destination address for the source device 105 to receive communications. In turn, instances of the valid traffic flow 106 may include and/or otherwise indicate the IP address 104 as the source IP address because the source IP address 104 is authentically associated with the source device 105. Therefore, an instance of the valid traffic flow 106 can be any instance of a traffic flow that indicates a source IP address which corresponds to the actual source device and which is not being used for nefarious purposes (e.g., as a probe message, IP sweeper and/or scanner, port sweeper and/or scanner, a part of a DDOS attack, network port mapping to gain unauthorized access, etc.).

The operating environment 100 can include one or more instances of probe traffic, such as a probe traffic flow 108. In some embodiments, instances of the probe traffic flow 108 may be referred to as "probe traffic." In various embodiments, instances of the probe traffic flow 108 refers to any network traffic that is and/or may be used for the purpose of analyzing, monitoring, learning, infiltrating, affecting, and/or attempting to gain access to and/or information about a network (e.g., the SPN 114), a datacenter (e.g., datacenters 120A-N discussed below), and/or any virtual network function ("VNF") (e.g., virtual routers, virtual machines, etc.). As such, in some embodiments, instances of the probe traffic flow 108 may be sent with nefarious purposes, although this may not necessarily be the case. For example, in some embodiments, an instance of the probe traffic flow 108 may include a message body that is empty (i.e., void of content), and therefore may be sent to a datacenter with the intent of probing and acquiring information about the state of the SPN 114 and/or the datacenter (e.g., the datacenters 120A-N). In some embodiments, an instance of the probe traffic flow 108 may include header information that is legitimate and authentically represents the source from which the probe traffic flow 108 was sent. For example, in an embodiment, the source device 105 may directly generate an instance of the probe traffic flow 108 and include connection information (e.g., an instance of the "5-tuple") in the header that indicates the IP address 104, which is the authentic IP source address for the source device 105. In other embodiments, the source device 105, the UE 101, and/or any other entity may use a botnet, such as a botnet 107, a proxy service, an IP sweeper application, and/or another intermediary that generates one or more instances of the probe traffic flow 108. Therefore, in some embodiments, an instance of the probe traffic flow 108 may provide and/or otherwise include an inaccurate, inauthentic, and/or otherwise spoofed source IP address (i.e., a source IP address that does not correspond to the actual IP address assigned to the actual source that initiated and/or triggered the probe traffic), such as any of IP addresses 109A-N.

For example, in some embodiments, the source device 105 may trigger and/or otherwise cause the botnet 107 to generate one or more instances of the probe traffic flow 108 in an attempt to hide and/or mask the actual source of the probe traffic (i.e., conceal that the source device 105 caused the probe traffic). As such, each instance of the probe traffic flow 108 can include a spoofed IP address (e.g., any of the IP addresses 109A-N) that does not correspond to the actual IP address (e.g., the source IP address 104) of the source device 105. In various embodiments, the IP addresses 109A-N may be changed dynamically, and therefore may not provide a static association. In some embodiments, the IP addresses 109A-N may be referred to as spoofed IP addresses and/or inauthentic IP addresses. In various embodiments, instances of the valid traffic flow 106 may be routed and/or handled alongside instances of the probe traffic flow 108, and therefore a network (e.g., the network 102) may handle a plurality of traffic flows that dynamically change in volume and source. For illustration purposes only, the operating environment 100 can include a plurality of dynamic traffic flows, such as dynamic traffic flows 112A-N, where the dynamic traffic flows 112A-N provide a plurality of traffic flows that could potentially correspond to instances of the probe traffic flow 108 and/or the valid traffic flow 106, and may not have a clear indication of whether the traffic flow is valid or a probe. As such, the dynamic traffic flows 112A-N can include a mixture of instances of the valid traffic flow 106 and the probe traffic flow 108.

In various embodiments, the operating environment 100 can include one or more instances of a Tier 1 ISP network, such as the Tier 1 ISP networks 110A-N. The network 102 can communicate with and/or otherwise be communicatively coupled to one or more instances of the Tier 1 ISP networks 110A-N. It is understood that an instance of a Tier 1 ISP network (e.g., any of the Tier 1 ISP networks 110A-N) refers to an internet provider network that exchanges traffic strictly through peering agreements with other provider networks (e.g., networks at various tiers, such as Tier 1 and/or Tier 2 ISPs), and as such can form, support, and/or otherwise be included in the backbone of the Internet. As such, in some embodiments, an instance of a Tier 1 ISP network (e.g., any of the Tier 1 ISP networks 110A-N) may be referred to and/or otherwise correspond with a backbone network that provides infrastructure to support various traffic flows.

The operating environment 100 can include an SPN, such as the SPN 114. The SPN 114 can communicate with and/or be communicatively coupled to an instance of a Tier 1 ISP network (e.g., any of the Tier 1 ISP networks 110A-N). The SPN 114 can be hosted by and/or be associated, in part or in whole, with a communications service provider. The SPN 114 may have peering arrangements with a Tier 1 ISP network. In some embodiments, an instance of the SPN 114 may be configured and/or operated as a Tier 2 network and/or a Tier 3 ISP network, as understood by one of ordinary skill in the technology. Therefore, the SPN 114 can have peering arrangements with any of a Tier 1 ISP network, a Tier 2 ISP network, a Tier 3 ISP network, or any combination thereof. The SPN 114 can include one or more of a radio access network, an evolved packet core network, a core network, an IP-based network, a transport network, an optical transport network, a circuit switched network, a mobile Wide Area Network, a combination thereof, or the like.

In some embodiments, the SPN 114 can include one or more instances of an internet gateway router (IGR), such as IGRs 116A-N. In embodiments, an IGR (e.g., any of the IGRs 116A-N) can refer to a carrier-grade router that facilitates communication between the SPN 114 and one or more of the Tier 1 ISP networks 110A-N. In some embodiments, an IGR (any of the IGRs 116A-N) may be referred to as a peering router. In some embodiments, the Tier 1 ISP networks 110A-N may include instances of the IGRs 116A-N, and therefore each of the IGRs 116A-N may be communicatively coupled to peer IGRs in the Tier 1 ISP networks 110A-N. In some embodiments, the SPN 114 can include one or more instances of an access router ("AR"), such as ARs 118A-N. An access router (e.g., any of the ARs 118A-N) can be in communication with a cloud gateway, such as a cloud gateway 122, and therefore can provide communicative coupling between the SPN 114 and a datacenter (e.g., any of the datacenters 120A-N). In various embodiments, the ARs 118A-N and/or the IGRs 116A-N can provide an internet connection to any of the Tier 1 ISP networks 110A-N. As such, the SPN 114 can enable exposure of one or more VNFs (e.g., virtual routers, virtual machines, sandboxes, applications, etc.) of a datacenter (e.g., any of the datacenters 120A-N) and/or any other device that communicates with the SPN 114 (e.g., an application server discussed below). In various embodiments, one or more network paths may be instantiated, established, and/or maintained between network devices of the SPN 114 so as to route traffic flows (that are permitted to be routed) within the SPN 114. For example, as shown in FIG. 1, the SPN 114 can establish and provide a first network path 156 and a second network path 157, where the first network path 156 can be is established between at least two designated scrubbing points of the SPN 114 (e.g., between the IGR 116A and the AR 118B), and the second network path 157 can be established between at least two designated scrubbing points of the SPN 114 (e.g., the IGR 116N with the AR 118N). It is understood that a network path may be established between any network devices within the SPN 114. As discussed in further detail below, any of the IGRs 116A-N and/or the ARs 118A-N may be designated as scrubbing points, and therefore may be referred to as a "designated scrubbing point" and/or a "designated scrubbing node."

The operating environment 100 can include one or more instances of a datacenter, such as the datacenters 120A-N. In some embodiments, a communications service provider may operate, manage, support, and/or provide the SPN 114 and an instance of a datacenter (e.g., any of the datacenters 120A-N), although this may not necessarily be the case in all embodiments. An instance of a datacenter (e.g., any of the datacenters 120A-N) can include a cloud gateway, such as the cloud gateway 122. The datacenters 120A-N can provide physical network functions ("PNF") and/or virtual network functions ("VNF"). For example, in various embodiments, instances of a datacenter (e.g., any of the datacenters 120A-N) can include one or more host compute nodes, such as host compute nodes 124A-N. Instances of a host compute node (e.g., any of the host compute nodes 124A-N) can include any computer and/or network device that supports, hosts, and/or provides a processing unit, a memory device, and/or any other computing resource to enable the PNFs. For example, instances of the host compute nodes 124A-N can provide physical hardware computing infrastructure that can be selected and/or activated from an available inventory of processing resources and memory resources, such as processors and memory storage devices. In various embodiments, the datacenters 120A-N can include a plurality of instances of the host compute nodes 124A-N so as to provide a network virtualization platform, aspects of which are discussed below with respect to FIG. 7, according to an embodiment.

In various embodiments, processors provided by one or more elements of the operating environment 100 can include one or more processing units that are configured as hardware components that perform computations to process data, via computer-executable instructions from one or more application programs, routines, operating systems, and/or other software, to provide, at least in part, any of the operations or composition of functions described herein. For example, the processors can include one or more central processing units ("CPUs") configured with one or more processing cores, one or more graphics processing unit ("GPU") configured to accelerate operations performed by one or more CPUs, and/or one or more systems on a chip ("SOC") to perform computations to process data, and/or to execute computer-executable instructions of one or more application programs, operating systems, and/or other software that may or may not include instructions particular to graphics and/or communications computations. Further discussion of embodiments of the processor as a processing unit and/or compute resources can be found with respect to FIG. 7 and FIG. 8. In some embodiments, the processors may support one or more aspects of a physical network topology and/or a virtual network topology, such as discussed in further detail with respect to FIG. 5. In various embodiments, the memory can include one or more memory storage devices that include hardware components that perform storage operations, including temporary or permanent storage operations. In some embodiments, the memory can include volatile and/or non-volatile memory implemented in any method or technology for storage of information such as computer-readable instructions, data structures, program modules, or other data disclosed herein. It is understood that, in the claims, use of the terms "memory," "computer storage medium," or variations thereof, does not include, and shall not be construed or interpreted to include, a wave or a signal per se and/or communication media.

In various embodiments, one or more instances of the host compute nodes 124A-N can support one or more instances of an operating system. In an embodiment, the operating system can correspond with an operating system from the LINUX family of operating systems built around a LINUX kernel, however this may not be the case for every embodiment. In some embodiments, the operating system can include, but is not limited to, one or more instances from members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like. It should be understood that the examples provided are for illustration purposes only, and therefore should not be construed as limiting in any way.

In some embodiments, instances of the host compute nodes 124A-N can include a network server, a switch, a gateway, an application server (such as discussed below), and/or any other computer system that can provide one or more PNFs. In various embodiments, the host compute nodes 124A-N can provide, host, support, and/or maintain one or more instances of VNFs, such as but not limited to, a virtual router ("VR"), such as any of VRs 126A-N, a virtual machine ("VM"), such as any of VMs 128A-N, a sandbox, such as a sandbox 133, and/or any other VNF. It is understood that the host compute nodes 124A-N can include an operating system and a virtual machine monitor, which may be configured as a bare metal hypervisor and/or a hosted hypervisor. The host compute nodes 124A-N may be configured and/or operate according to one or more aspects discussed below with respect to FIGS. 5, 7, and/or 8, according to various embodiments.

In some embodiments, the cloud gateway 122 may be communicatively located ahead of the VRs 126A-N, the VMs 128A-N, and/or the sandbox 133, and as such, any traffic flows (e.g., the valid traffic flow 106, the probe traffic flow 108, and/or the dynamic traffic flows 112A-N) may be routed through the cloud gateway 122 prior to being received by the intended target, such as the VRs 126A-N, the VMs 128A-N, the sandbox 133, and/or any other application and/or VNF. In various embodiments, each of the host compute nodes 124A-N can include, host, and/or correspond with one or more instances of the VRs 126A-N. The VRs 126A-N can serve as an intermediary between the cloud gateway 122 and a VNF, such as but not limited to, any of the VMs 128A-N and/or the sandbox 133.

In various embodiments, the datacenters 120A-N and/or the SPN 114 can host, provide, and/or otherwise support one or more instances of virtualized and/or non-virtualized network services, such as but not limited to, communication services, compute services, storage services, routing services, switching services, relay services, and/or other virtualized or non-virtualized network service. It should be understood that the term "service" should be construed as corresponding to one or more executing software, firmware, and/or hardware that can provide a set of communication and/or network functions on behalf of a computer system, a network device, and/or a network (e.g., any of the SPN 114, the datacenters 120A-N, the host compute nodes 124A-N, etc.), and therefore the term "service" does not include and should not be construed as being directed to any abstract idea or judicial exception. The network services can be used by a service provider, by third parties, and/or by customers via user equipment, servers, and/or other virtualized and/or non-virtualized computing systems. In various embodiments, a service provider associated with the datacenters 120A-N may offer and/or allocate one or more instances of the VMs 128A-N to potential customer tenants, which can run and/or execute applications and/or services, such as virtual tenant applications 134A-N. The virtual tenant applications 134A-N refers to any application and service that can be hosted and/or otherwise executed by one or more of the VMs 128A-N. One or more instances of the host compute nodes 124A-N can provide the VMs 128A-N, and a communication service provider can provide a subscription service to access the platform provided by the host compute nodes 124A-N.

In some embodiments, a communication service provider associated with the SPN 114 and/or the datacenters 120A-N may offer and/or otherwise provide a scrubbing service 130. The scrubbing service 130 can include and/or otherwise provide a virtualized and/or non-virtualized network service that constructs, establishes, instantiates, and/or maintains a scrubbed IP domain, such as a scrubbed IP domain 140. The scrubbed IP domain 140 provides a range of protected IP addresses that can only be accessed via routing through the SPN 114 and/or the datacenters 120A-N providing the scrubbing service 130. The scrubbed IP domain 140 includes and provides a plurality of publicly routable IP addresses, such as publicly routable IP addresses 138A-N. In some embodiments, the scrubbed IP domain 140 can include and provide scrubbed IP subnets, such as scrubbed IP subnets 136A-N. In various embodiments, at least one of (or in some embodiments a subset that is a range) the publicly routable IP addresses 138A-N can be assigned to an instance of a scrubbed IP subnet (e.g., any of the scrubbed IP subnets 136A-N). Therefore, instances of a scrubbed IP subnet (e.g., any of the scrubbed IP subnets 136A-N) can be publicly routable, and thus may be considered to be a scrubbed publicly routable IP subnet that is protected from being contacted and/or reached by probe traffic (e.g., one or more instances of the probe traffic flow 108) while being publicly available and exposed to an internet connection (such as the internet connection 111 and/or provided by any of the IGRs 116A-N). As such, in some embodiments, at least one instance of a scrubbed IP subnet (e.g., any of the scrubbed IP subnets 136A-N) can include and refer to IP addresses (and corresponding virtual machines and/or virtual tenant applications) that are protected by the scrubbing service 130 so as not to be reachable by (i.e., cannot be contacted by) probe traffic flows (e.g., instances of the probe traffic flow 108 that may be included among the dynamic traffic flows 112A-N) despite being advertised and/or exposed to the internet via an internet connection (such as provided by the SPN 114). The range of protected, publicly available IP addresses provided by the scrubbed IP domain 140 can be dynamically assigned to an instance of a scrubbed IP subnet, such as any of the scrubbed IP subnets 136A-N. In some embodiments, an instance of a publicly routable IP address (e.g., any of the publicly routable IP addresses 138A-N) can be configured as an IPv4 address or an IPv6 address, and can be publicly unambiguous. In some embodiments, an instance of the publicly reachable IP addresses (e.g., the publicly routable IP addresses 138A-N) may be externally exposed via advertisement and/or public broadcast using an Internet connection (e.g., provided by any of the IGRs 116A-N), and in some embodiments, may use a standardized protocol, such as but not limited to, a Border Gateway Protocol. The virtual tenant applications 134A-N can be onboarded to an instance of a datacenter (e.g., the datacenters 120A-N) by allocating one or more of the publicly routable IP addresses 138A-N, the scrubbed IP subnets 136A-N to the virtual machine (e.g., any of the VMs 128A-N), and/or to the virtual tenant applications 134A-N. Instances of the probe traffic flow 108 may attempt to contact an end-point associated with any of the publicly routable IP addresses 138A-N, and therefore probe traffic may be considered to be unsolicited from the perspective of the end-point (e.g., an exposed application 132, the sandbox 133, any virtual machine and/or container, etc.) due to exposure to an internet connection, such as the internet connection 111. One or more instances of the internet connection 111 can be provided by one or more instance of the datacenters 120A-N and/or the SPN 114.

In various embodiments, the scrubbed IP domain 140 is inaccessible to active botnet and automated probes based on, for example, the scrubbing service 130 providing distributed dynamic scrubbing of probe traffic, automated learning of changes and/or trends in dynamic probe traffic, managing the allocation of designated scrubbing points, and handling the sequence of where a probe traffic flow should be scrubbed along a network path. In some embodiments, the scrubbing service 130 may be available and/otherwise offered as a subscription service by a communications service provider, where the scrubbing service 130 may be provided in the configuration of a platform-as-a-service, a software-as-a-service, a combination thereof, or another service. In some embodiments, without the scrubbing service 130 operating and providing support for the construction and maintenance of the scrubbed IP domain 140, probe traffic (e.g., instances of the probe traffic flow 108 that are routed among the dynamic traffic flows 112A-N) might be routed and reach Internet-facing virtual machines without detection, and as such, potentially nefarious dynamic probe traffic (which can include requests and/or messages that attempt to hide and/or obfuscate the real and/or authentic identity of the source of the traffic flow) may be able to evade any security groups and/or application security policy that is local to (i.e., executed by) an endpoint of a datacenter (e.g., a virtual machine and/or virtual container). Therefore, aspects of the present disclosure can improve the performance of network resources by configuring the VMs 128A-N (along with any other VNF) to execute within the scrubbed IP domain 140, and in turn, the virtual tenant applications 134A-N are protected from probe traffic (i.e., are protected from instances of the probe traffic flow 108 reaching, communicating, analyzing, and/or otherwise identifying information about the VMs 128A-N, the virtual tenant applications 134A-N, and/or any other VNF that operates and/or is otherwise assigned to use the scrubbed IP domain 140).

In various embodiments, the scrubbing service 130 and the scrubbed IP domain 140 can ensure that instances of the VMs 128A-N and correspondingly assigned virtual tenant applications 134A-N cannot be reached by unauthorized probe traffic, and as such, any probe traffic flow can be scrubbed (i.e., filtered, dropped, quarantined, rerouted, and/or otherwise not delivered) at designated scrubbing points along a network path within the SPN 114 and/or the datacenter 120A, and therefore will not reach the VMs 128A-N, which can relieve a security group routine and/or an application security policy at the virtual machine from performing filtering and thus improve operating performance by ensuring that processing cycles are not wasted.

The operating environment 100 can include an instance of an application server, such as an application server 150. In some embodiments, the application server 150 can be provided by the SPN 114, although this may not necessarily be the case. In some embodiments, the application server 150 may be provided by any computer system and/or network device of the SPN 114 and/or the datacenters 120A-N. In some embodiments, the application server 150 may be provided by one or more instances of the datacenters 120A-N, such as by one or more of the host compute nodes 124A-N. In some embodiments, the application server 150 may be configured as a security policy controller and/or service orchestrator. In some embodiments, the application server 150 may be configured as a virtualized server that is used to host and/or otherwise support the scrubbing service 130. In various embodiments, the application server 150 can be designated and/or assigned to support, execute, and implement the scrubbing service 130. In some embodiments, the application server 150 may be configured as a virtualized server that is used to host and/or otherwise support the scrubbing service 130.

In some embodiments, the operating environment 100 can include a sandbox, such as the sandbox 133. The sandbox 133 can be configured as a virtualized container and/or virtual machine that provides an isolated, secure execution environment to facilitate the detection of and/or recordation of any and/or all traffic flows to one or more datacenter (e.g., an instance of the probe traffic flow 108) without exposing other virtual machines and/or containers to the traffic flows (which may include potentially nefarious, malicious, and/or unknown probe traffic). The sandbox 133 can be provided by a virtual machine of a host compute node (e.g., any of the host compute nodes 124A-N). In various embodiments, the scrubbed IP domain 140 is created and maintained without sole reliance on a static and/or manual configuration for detecting probe traffic flows (such as from among the dynamic traffic flows 112A-N). For example, in some embodiments, an application, such as an exposed application 132, can be implemented to support detection, monitoring, and/or recordation of changes, patterns, trends, and/or identities in traffic flows (e.g., probe traffic flows) that are requesting to be routed and/or otherwise directed to various instances of publicly routable IP addresses (e.g., any of the publicly routable IP addresses 138A-N). In some embodiments, the exposed application 132 can be assigned to, and execute from, an instance of the sandbox 133. In some embodiments, each instance of a datacenter (e.g., any of the datacenters 120A-N) can include an instance of the sandbox 133 and/or the exposed application 132.

In some embodiments, each instance of the exposed application 132 can report and/or otherwise provide information determined and/or otherwise detected about probe traffic to the application server 150 and/or the executing scrubbing service 130. In various embodiments, the exposed application 132 can allow (and/or otherwise accept without reservation) instances of traffic flows to be routed past an intermediate network node (e.g., a firewall, a demilitarized zone, the cloud gateway 122, and/or any instance of the scrubbing client 152) and thus reach the exposed application 132 so as to authorize the traffic flow (including a probe traffic flow) to perform the operation that the traffic flow was configured to perform—such as allowing an instance of the probe traffic 108 to ping the exposed application and/or allowing the valid traffic flow 106 to request access from the exposed application 132. For example, in some embodiments, the scrubbing service 130 and/or the application server 150 can instruct one or more network devices of the SPN 114 and/or the datacenters 120A-N to allow all traffic flows (irrespective of probe traffic flows that are were previously instructed to be dropped, filtered, and/or scrubbed prior to the exposed application 132 being exposed and/or advertised to the SPN 114 via the Internet connection 111). In response to exposing (e.g., by providing the internet connection 111) the exposed application 132 to the SPN 114, the scrubbing service 130 can instruct traffic flows (which are directed to and/or targeting the exposed application 132 and/or a publicly routable IP address associated with the exposed application 132) to be routed through the SPN 114 and the cloud gateway 122 (and not be dropped and/or scrubbed), and along an isolated path, such as an isolated path 164, such that incoming traffic flows (e.g., any of the dynamic traffic flows 112A-N, irrespective of whether the traffic flows include valid and/or probe traffic) are not initially scrubbed by the SPN 114 and/or dropped by a firewall (e.g., a firewall of the cloud gateway 122). The isolated path 164 can include a dedicated communication path to the exposed application 132 so as to prevent any traffic flows from discovering and/or obtaining information about the datacenter (e.g., any other virtual machines and/or containers) apart from the information that is permitted to be exposed by the exposed application 132 and/or the scrubbing service 130. When the exposed application 132 is exposed to the internet connection 111, various instances of traffic flows may target and/or be directed to the exposed application 132 (e.g., by a corresponding publicly routable IP address), and thus may be routed from a source (e.g., the source device 105 and/or the botnet 107), through one or more networks (e.g., the network 102 and/or the Tier 1 ISP networks 110A-N) to the SPN 114. The scrubbing service 130 can (temporarily) suspend any filtering, scrubbing, and/or dropping of probe traffic flows targeting the exposed application 132, and allow (all of) the traffic flows to be directed along a network path from one of the IGRs 116A-N to one of the ARs 118A-N (e.g., a network path 156 from the IGR 116A to the AR 118B and/or a network path 157 from the IGR 116N to the AR 118N), then from the SPN 114 to the cloud gateway 122 of one of the datacenters 120A-N (e.g., via either of network paths 158, 159 from the ARs 118B, 118N, to the cloud gateway 122, respectively) via the internet connection 111, and along the isolated path 164 from the cloud gateway 122 within a datacenter (e.g., the datacenter 120A) to the exposed application 132. By this, the isolated path 164 can enable the exposed application 132 to be exposed and/or otherwise advertised (i.e., globally discoverable and publicly routable) to the internet via an internet connection (e.g., the internet connection 111 and/or provided by any of the IGRs 116A-N of the SPN 114), without exposing any of the VMs 128A-N (which at the time are not supporting and/or hosting the exposed application 132 and/or the sandbox 133) to any instances of traffic flows (irrespective of whether the traffic flows are the valid traffic flow 106 and/or the probe traffic flow 108). Stated differently, the exposed application 132 may be isolated from instances of virtual services and/or applications (e.g., a virtual tenant application) that is in queue to be assigned and/or instantiated into a scrubbed internet protocol domain (e.g., a scrubbed IP domain 140 discussed below), such as due to the virtual machines, virtual services, and/or virtual applications not yet being allocated a publicly routable IP address, and therefore are not discoverable and/or reachable by traffic flows. As such, irrespective of whether the SPN 114 has previously implemented a policy and/or security scheme to scrub, filter, and/or otherwise drop a particular instance of traffic (e.g., an instance of the probe traffic flow 108), the scrubbing service 130 may instruct the SPN 114 and/or any other device and/or network node to permit and/or allow the traffic flows to be routed toward, and actually reach, the exposed application 132 (which is the intended target of the traffic flow).

In some embodiments, the exposed application 132 may present a shell website, software service, and/or another user interface so as to appear as a fully operational, authentic application that can be reached via the publicly routable IP address, but without the exposed application 132 offering the traffic flows any content and/or without providing a response to requests (which may have been included in the traffic flows). In some embodiments, the exposed application 132 may be fully operational and may provide responses and/or content to the traffic flows, although this may not necessarily be the case. By this, the exposed application 132 can identify the nature of the operations that the traffic flow is requesting from the exposed application 132 so as to identify and/or otherwise determine whether the traffic flow should be designated as a probe traffic flow. The exposed application 132 can record and/or otherwise inform the application server 150 (and/or the scrubbing service 130) of a source IP address of the traffic flow (e.g., the IP addresses 109A-N indicated by instances of the probe traffic flow 108 from the botnet 107); duplicate (i.e., identical in content of the traffic flow) traffic flows where each instance is being sent from separate instances of a Tier 1 ISP network (e.g., one traffic flow being sent from the Tier 1 ISP network 110A and another sent from the Tier 1 ISP network 110N in an attempt to avoid detection as coming from the same source, such as from the botnet 107); the time of the traffic flow request; and any other information that can be detected from the traffic flow and/or about how the traffic flow was handled while traversing the SPN 114 and/or the datacenter (e.g., any of the datacenters 120A-N).

In various embodiments, the scrubbed IP domain 140 can be constructed and deployed using the exposed application 132 before any virtual tenants (e.g., any of the virtual tenant applications 134A-N) are on-boarded (i.e., before allocation of a particular one or more instances of the virtual tenant applications 134A-N to an instance of a virtual machine occurs).

In some embodiments, because the external-facing IP addresses (e.g., the publicly routable IP addresses 138A-N) are known at a cloud design stage of cloud infrastructure implementation, the scrubbed IP domain 140 can be pre-constructed before instances of the virtual tenant applications 134A-N are allocated, launched, and/or deployed from one or more of the VMs 128A-N.

Figure 2:
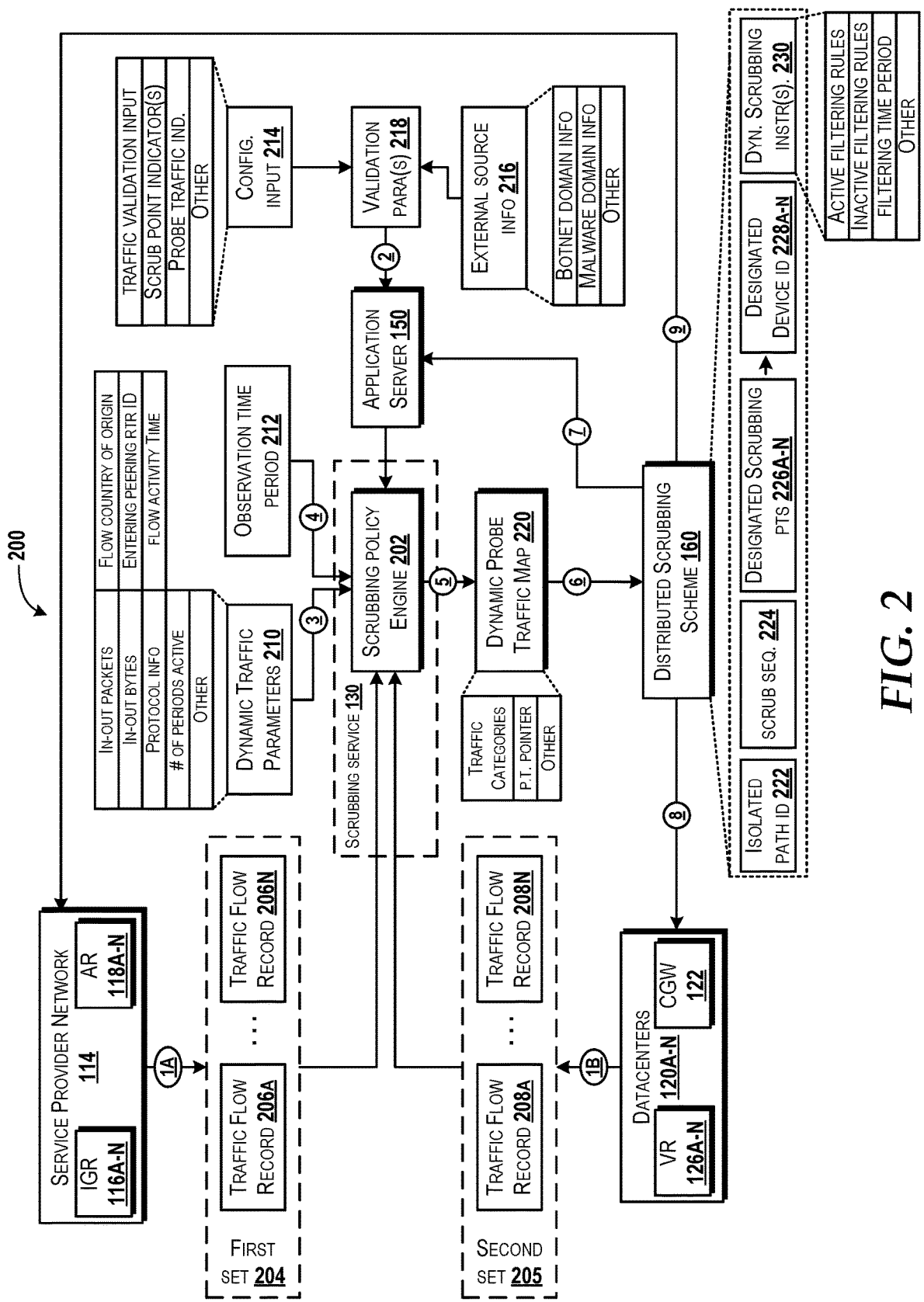
FIG. 2 is a block diagram illustrating aspects for facilitating and maintaining a scrubbed internet protocol domain, according to an illustrative embodiment.

In each cloud datacenter, an instance of the exposed application 132 can be run using one or more of the publicly routable IP addresses 138A-N from each external facing IP subnet (e.g., the scrubbed IP subnets 136A-N that use the publicly routable IP addresses 138A-N) assigned to the datacenter (e.g., one or more of the datacenters 120A-N). By monitoring the traffic flows (e.g., any of the dynamic traffic flows 112A-N) reaching the exposed application 132, the scrubbing service 130 can be tuned and/or iteratively reconfigured so as to eliminate all probe traffic (e.g., instances of the probe traffic flow 108 from automated botnets such as the botnet 107) prior to the probe traffic reaching the VMs 128A-N. In some embodiments, the scrubbing service 130 can execute a scrubbing policy engine, which is illustrated in FIG. 2, that can provide and implement a machine learning clustering process. In some embodiments, at least a portion of a machine learning algorithm may be implemented as a machine learning clustering process that transforms one or more resources, such as a physical and/or virtualized processor, memory, and/or the like. The machine learning cluster process refers to a computer executable set of instructions that identifies, collates, assigns, and/or groups data points for analysis. For example, given a set of data points identified from the traffic flows (e.g., any of the dynamic traffic flows 112A-N), the scrubbing service 130 can use a clustering process to classify each data point into a specific group. The data points can correspond to dynamic traffic parameters, such as discussed with respect to FIG. 2. The scrubbing service 130 can infer that data points which are in the same group should have similar properties and/or features, while data points in different groups should have dissimilar properties and/or features, and therefore should not be associated with each other. As such, the scrubbing service 130 can provide unsupervised dynamic learning and detection of probe traffic so as to construct and maintain the scrubbed IP domain 140.

In various embodiments, the exposed application 132 can send a configuration message 166 to the application server 150 and/or the scrubbing service 130, where the configuration message 166 can include data points and information detected and identified about the traffic flows received by the exposed application 132 via the isolated path 164. Examples of information that can be included in the configuration message 166 can include dynamic traffic parameters, such as discussed below with respect to FIG. 2. In various embodiments, the scrubbing service 130 and/or the application server 150 can instruct the exposed application 132 to remain exposed to the internet, and thus be publicly routable during an observation time period, such as an observation time period 148. In some embodiments, the observation time period 148 can vary for each instance of the exposed application 132, and therefore some instances of the exposed application 132 that can be exposed to the internet connection for (non)uniform time periods. In some embodiments, the exposed application 132 may be implemented (a)periodically so that detection of probe traffic can remain dynamic and up to date. For example, the scrubbed IP domain 140 can reroute traffic flows to the exposed application 132 once per day, per hour, and/or another time interval, and the exposed application 132 can analyze and detect for probe traffic flows during the observation time period 148. Once the observation time period 148 elapses, the exposed application 132 can report the identification data points and any other dynamic traffic parameters to the application server 150 and/or the scrubbing service 130.

In various embodiments, the scrubbing service 130 can construct, establish, and/or maintain the scrubbed IP domain 140 by generating a distributed scrubbing scheme, such as a distributed scrubbing scheme ("DSS") 160. The DSS 160 can be created and maintained based on information obtained and detected from the SPN 114, the datacenters 120A-N, the exposed application 132, and/or from one or more external sources. For example, in some embodiments, a user 147 can provide, to the application server 150 and/or the scrubbing service 130, instances of configuration input 146 that can supplement and/or compliment the information obtained from the exposed application 132. For example, the configuration input 146 can include, but should not be limited to, traffic flow validation input that indicates and/or identifies instances of the detected traffic flows (e.g., instances of the dynamic traffic flows 112A-N detected by the exposed application 132 and/or another network device of the SPN 114 and/or the datacenters 120A-N) which are associated with a valid, authentic source, and thus should be allowed to proceed to the scrubbed IP domain 140; input of probe traffic indications that identify particular detected traffic flows that have source IP addresses which should be designated as a source of unauthorized probe traffic, and thus subsequently detect traffic flows treated as an instance of the probe traffic flow 108. In various embodiments, the application server 150 and/or the scrubbing service 130 can use an external source (i.e., external to the SPN 114 and/or the datacenters 120A-N) as supplemental input to the clustering process for the generation, update, (re)configuration, and/or maintenance of the DSS 160, and as such, can enable dynamic scrubbing of probe traffic flows by ensuring that the DSS 160 and scrubbing service 130 are up-to-date relative to known and detected probe traffic threats. Examples of an external source can include, but should not be limited to, botnet domain information and/or malware domain information that is publicly and/or privately available from third-party data stores. An example embodiment pertaining to aspects of the DSS 160 is discussed below and illustrated with respect to FIG. 2.

The use of the information provided by the exposed application 132, any network devices of the SPN 114 and/or the datacenters 120A-N, and/or external sources, can be input to the clustering process of the scrubbing service 130 so as to fine tune and configure the DSS 160, which in turn can facilitate dynamic scrubbing and allow the DSS 160 to be deployed to designated scrubbing points within the SPN 114 and/or the datacenters 120A-N for the construction and maintenance of the scrubbed IP domain 140. In various embodiments, the scrubbing service 130 can designate particular network devices to serve as scrubbing points, which are nodes along a network path where scrubbing of probe traffic occurs prior to reaching the VMs 128A-N. For example, the DSS 160 can include device identifiers corresponding to the network devices that are to serve as designated scrubbing points. A designated scrubbing point can refer to any network device that includes a scrubbing client 152 to implement the scrubbing service 130. In various embodiments, an instance of the scrubbing client 152 can provide executable instructions that can be stored and executed on network devices of the SPN 114 and/or the datacenters 120A-N. Each instance of the scrubbing client 152 can implement flow filtering rules, such as rules indicating which traffic flows should be permitted to be routed to the target destination, whether the current node should perform the scrubbing or a downstream node should perform scrubbing, the length of time scrubbing of a particular node should be in effect, and/or another rule. The filtering rules can be active or inactive, and the scrubbing service 130 can activate various rules by distribution of the DSS 160. The scrubbing client 152 can implement instructions provided by the DSS 160, such as which designated scrubbing point is to provide scrubbing of probe traffic at a particular time and particular point along a network path within the SPN 114 and/or the datacenters 120A-N. Therefore, instances of a designated scrubbing point that executes the scrubbing client 152 can implement the DSS 160 so as to establish, construct, and/or maintain the scrubbed IP domain 140. Examples of a designated scrubbing point can include, but should not be limited to, any of the IGRs 116A-N, the ARs 118A-N, the cloud gateway 122, the VRs 126A-N, and any other network device of the SPN 114 and/or the datacenters 120A-N. As such, an instance of the scrubbing client 152 can be instantiated and executed from a designated scrubbing point.

In various embodiments, an instance of a designated scrubbing point within the SPN 114 and/or the datacenters 120A-N can implement the DSS 160 so as to monitor, analyze, detect, and/or identify instances of probe traffic flows, such as the probe traffic flow 108. In some embodiments, the DSS 160 can create a scrubbing sequence, such as a scrubbing sequence 224 discussed below. The scrubbing sequence instructs the SPN 114 and/or a datacenter that a probe traffic flow instance is to be scrubbed from a network path at a particular designated scrubbing point, while other designated scrubbing points along the network path are instructed to allow the probe traffic flow to be routed to the next hop, where the next and/or subsequent hops (which are also designated scrubbing points) may perform the scrubbing. In some embodiments, a scrubbing sequence may be referred to as a distributed scrubbing sequence and/or a cascade scrubbing sequence. For example, in an embodiment, an instance of the probe traffic flow 108 may be routed from the Tier 1 ISP network 110A to the SPN 114 via the IGR 116A. In some embodiments, the IGR 116A is a designated scrubbing point executing the scrubbing client 152, and in turn the DSS 160 may instruct the IGR 116A to scrub and/or otherwise prevent the detected probe traffic (e.g., the probe traffic flow 108) from being internally routed to the AR 118B. As such, in an embodiment, the IGR 116A may scrub and prevent the detected probe traffic from progressing along the network path 156 within the SPN 114, and therefore the detected probe traffic may be designated as a blocked probe traffic flow, such as a blocked traffic flow 154A at the IGR 116A. In another embodiment, the DSS 160 may instruct the scrubbing client 152 of the IGR 116A to allow the detected probe traffic (e.g., the probe traffic flow 108) to proceed along the network path 156 to the AR 118B, despite the scrubbing service 130 (e.g., via the IGR 116A) having detected and determined that the traffic is probe traffic that could be scrubbed. In some embodiments, the detected probe traffic may be allowed to proceed along a network path towards a target (e.g., towards any of the VMs 128A-N) in order to distribute handling and scrubbing of the probe traffic. By this, the designated scrubbing points may not operate in a uniform, distributed manner, but rather can operate sequentially as defined by the DSS 160 so as to not overload a single designated scrubbing point. Therefore, the IGR 116A may allow the detected probe traffic (e.g., the probe traffic flow 108) to proceed along the network path 156 to the AR 118B, which can perform operations for maintaining the scrubbed IP domain 140 because the AR 118B can be a designated scrubbing point that executes an instance of the scrubbing client 152. As such, in an embodiment, the AR 118B may scrub the detected probe traffic prior to the traffic leaving the SPN 114, and therefore the detected probe traffic may be scrubbed and designated as a blocked probe traffic flow 154E at the AR 118B. Each designated scrubbing point can generate scrubbing records that indicate which traffic flows were allowed to proceed and which were blocked, along with any other information about how traffic flows were handled by the designated scrubbing point. In some embodiments, the records pertaining to scrubbing traffic flows so as to establish and/or maintain the scrubbed IP domain 140 may be referred to as a traffic flow record, which are discussed below with respect to FIG. 2.

By way of another example, the SPN 114 may receive the dynamic traffic flows 112A-N and an instance of the probe traffic flow 108 may be routed from a Tier 1 ISP network (e.g., any of the Tier 1 ISP networks 110A-N) to the IGR 116N of the SPN 114. It is understood that the IGRs 116A-N may be considered to be carrier-grade peering routers, and as such, the probe traffic flow 108 is received by a carrier-grade peering router. Continuing with this example, in some embodiments, the scrubbing service 130 (e.g., via the IGR 116N) may detect that a traffic flow is probe traffic (e.g., the probe traffic flow 108), and may instruct the IGR 116N to scrub the detected probe traffic and record the scrubbing operation as a blocked probe traffic flow 154C at the IGR 116N. In other embodiments, the scrubbing service 130 can configure the DSS 160 so as to instruct the IGR 116N to allow the detected probe traffic to proceed to the AR 118N along the network path 157, despite the scrubbing service 130 (e.g., via the scrubbing client 152) determining that the probe traffic could be scrubbed and/or otherwise not delivered to the next hop, such as the AR 118N. In some embodiments, the IGR 116N may allow one instance of the probe traffic flow 108 to proceed to the AR 118N, but a subsequent instance of a traffic flow that is detected to be probe traffic may be scrubbed by the IGR 116N. By this, each of the designated scrubbing points may perform scrubbing in a non-uniform sequence, such as defined by the DSS 160. Continuing with the example, in some embodiments, the AR 118N may receive the previously detected (or not yet detected) probe traffic and can be instructed to detect whether the traffic flow should be scrubbed prior to being routed out of the SPN 114. In some embodiments, the AR 118N can be instructed by the DSS 160 to scrub the detected probe traffic prior to the traffic flow being routed out of the SPN 114, and therefore the detected traffic flow can be designated and recorded as a blocked probe traffic flow 154D at the AR 118N. In various embodiments, when a traffic flow is indicated as a probe traffic flow and scrubbed, the designated scrubbing point that performs the scrubbing operation may record and provide information pertaining to the scrubbing, such as time of occurrence, and/or any other information provided by the traffic flow record and/or the dynamic traffic parameters discussed below with respect to FIG. 2.

In various embodiments, one or more of the designated scrubbing points may permit an instance of the probe traffic flow to proceed along a network path (e.g., one of the network paths 158, 159), out of the SPN 114, and to an instance of the cloud gateway 122. The cloud gateway 122 can be configured as a designated scrubbing point, and as such, in some embodiments, can scrub an instance of the probe traffic flow 108 so as to record and designate the traffic flow as a blocked probe traffic flow 154F at the cloud gateway 122. In an embodiment, the cloud gateway 122 may permit the probe traffic flow 108 to be routed to a virtual router that is instructed to scrub the detected probe traffic, such as due to the virtual router being the last designated scrub point in a sequence of designated scrubbing sequences defined by the DSS 160, such as discussed with respect to FIG. 2. As such, in an embodiment, a virtual router, such as the VR 126A, can scrub the detected probe traffic and record the traffic flow as a blocked probe traffic flow 154G at the VR 126A. In various embodiments, each of the designated scrubbing points can provide the traffic flow records to the application server 150 and/or the scrubbing service 130.

In various embodiments, once the scrubbing service 130 has ensured that a scrubbed IP domain 140 has been established and/or that one or more network paths between designated scrubbing points and a VM has been (and/or can be) generated, then the scrubbing service 130 may permit and/or otherwise authorize one or more instances of the virtual tenant applications 134A-N to be on-boarded. Therefore, one or more of the virtual tenant applications 134A-N can be assigned to one or more of the VMs 128A-N that are protected by the scrubbed IP domain 140, and allocate one or more of the publicly routable IP addresses 138A-N and/or the scrubbed IP subnets 136A-N to the virtual tenant applications 134A-N. In some embodiments, the onboarding process may be activated and/or implemented in response to a virtual tenant request 162 being received by the scrubbing service 130 from a requesting device, such as but not limited to, an instance of the UE 101 that subscribes to the scrubbed IP domain 140 and use of the cloud infrastructure provided by the datacenters 120A-N. It is understood that the examples provided are for illustration purposes only, and therefore should not be construed as limiting in any way.

In various embodiments, when aspects of the present disclosure are implemented, at least some (and/or all) cloud IP addresses (e.g., the publicly routable IP addresses 138A-N) used for external-facing applications of virtual tenants (e.g., the virtual tenant applications 134A-N) can (and/or otherwise should) be assigned from the scrubbed IP domain 140 because the scrubbed IP domain 140 is protected from probe traffic by the dynamic, distributed scrubbing of the scrubbing service 130 via the DSS 160 and the designated scrubbing points (e.g., any of the IGRs 116A-N, ARs 118A-N, the cloud gateway 122, and/or the VRs 126A-N). In various embodiments, botnet traffic flows and/or any other potentially nefarious traffic flows can be scrubbed at different points along the network path within the SPN 114 and/or the datacenters 120A-N prior to reaching the VMs 128A-N (and thus prior to reaching the scrubbed IP domain 140). In various embodiments, cloud administrators can see whether at least some (and/or all) invalid traffic (e.g., the probe traffic) reaches the protected cloud infrastructure (e.g., the VMs 128A-N of the datacenters 120A-N) at any time (e.g., in real-time and/or near-real-time), by accessing the scrubbing service (e.g., from the application server 150 that can serve as the security policy controller of the datacenters 120A-N and/or the SPN 114). In various embodiments, after one or more of the virtual tenant applications 134A-N has been on-boarded to the protected cloud (i.e., assigned to one or more of the VMs 128A-N and allocated resources, one or more of the publicly routable IP addresses 138A-N, and/or the scrubbed IP subnets 136A-N), the application server 150 may detect whether any residual probe traffic is and/or has reached one or more of the virtual tenant applications 134A-N in the datacenters 120A-N, and in turn the application server 150 may tune and/or reconfigure the scrubbing service 130 (e.g., a machine learning clustering process) to detect the previously unscrubbed probe traffic in order to scrub subsequent probe traffic exhibiting associated probe attributes (e.g., dynamic traffic parameters discussed with respect to FIG. 2). In some embodiments, the detection and scrubbing of subsequent probe traffic (that would have previously gone undetected and/or unfiltered) may be provided by the scrubbing service 130 increasing the number of clusters in the machine learning clustering process (i.e., clusters of associated data points about the probe traffic into additional groups) and/or by using additional traffic attributes of the probe traffic flows. Examples of additional traffic attributes can include, but should not be limited to, the time of day that a flow is active, country of origin of traffic flows, entering peering router, recognition of patterns in continuously changing source IP addresses, inauthentic (i.e., spoofed and not true) source IP addresses based on cross reference with external source information, size of the data packets, other information, or the like. In some embodiments, peering routers that scrub and/or do not scrub a detected probe traffic flow can report and/or otherwise provide instances of the additional traffic attributes to the scrubbing service 130.

In some embodiments, use of publicly routable IP addresses (e.g., the publicly routable IP addresses 138A-N and/or associated scrubbed IP subnets 136A-N) that are associated with the virtual tenant applications (e.g., any of the virtual tenant applications 134A-N) in the scrubbed IP domain 140 can enable corresponding virtual tenant administrators options to enable the generation of customized local virtual application security configurations that trigger an instance of the DSS 160 to be configured specifically for the traffic flows that are targeting (and/or otherwise requesting to be directed to) a virtual tenant application (e.g., any of the virtual tenant applications 134A-N within the scrubbed IP domain 140). For example, without the scrubbed IP domain 140, an application that attempted to implement a local security policy with an "allow all traffic flow" setting may be bombarded with (and thus receive a plurality of) all traffic flows, irrespective of whether the traffic flow corresponds to a probe traffic flow. Aspects and embodiments of the present disclosure can provide virtual tenant administrators the option to rapidly generate customized local virtual application security policies using an "allow all traffic flow" setting based on the corresponding virtual tenant application residing within the scrubbed IP domain 140 (and thus being allocated one or more of the publicly routable IP addresses 138A-N). For example, use of the scrubbed IP domain 140 can allow virtual tenant applications 134A-N to initially start with a liberal security policy (e.g., an allow all security policy), and in turn, use the scrubbing service 130 to implement the clustering process that iterative determines and detects the traffic flows that are targeting the particular virtual tenant application. As such, the scrubbing service 130 can create (and/or support the creation of) a customized local virtual application security policy that, in some embodiments, may be implemented by a customized instance of the DSS 160 for the virtual tenant application. The scrubbing service 130 can be used to create the customized local security policy and/or the generate the customized instance of the DSS 160 by limiting the input to the machine learning clustering process (e.g., input to a scrubbing policy engine discussed below with respect to FIG. 2 that generates the DSS 160) to incoming traffic flows (at each designated scrubbing point) that are destined for the protected IP address(es) used by the virtual tenant application (e.g., publicly routable IP addresses 138A-N assigned to one or more of the virtual tenant applications 134A-N). The customized local virtual tenant application security policy and/or the customized DSS 160 can eliminate a time bottleneck that may be caused by overly liberal security policies that could otherwise get blocked and/or not implemented due to verification checks that fail to consider the configuration of the SPN 114 and/or the datacenters 120A-N. The customized local virtual tenant application security policy and/or the customized DSS 160 may also reduce the compute resources allocated to manual construction of static security rules that fail to account for the dynamic nature of probe traffic flows.

Figure 1B:
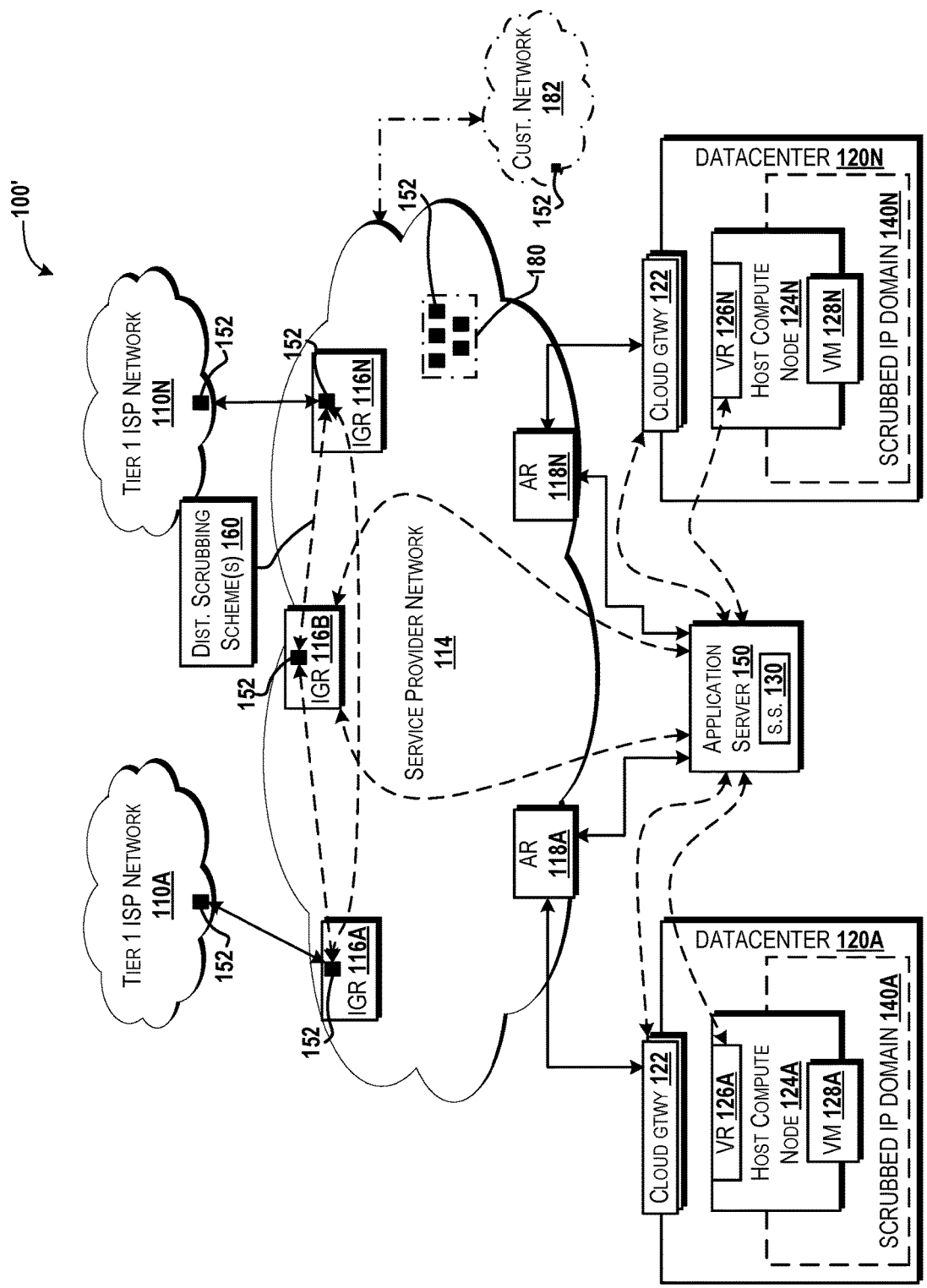
FIG. 1B is a block diagram illustrating an example operating environment in which a scrubbed internet protocol domain for enhanced cloud security can be implemented, according to another illustrative embodiment.

In another embodiment of the operating environment 100, a first datacenter (e.g., from among the datacenters 120A-N) may generate, support, and/or provide a first instance of the scrubbed IP domain 140, and a second datacenter (e.g., from among the datacenters 120A-N) may generate, support, and/or provide a second instance of the scrubbed IP domain 140, where both the first datacenter and the second datacenter may be communicatively coupled to (and thus share communication with) the SPN 114. In some embodiments, the VNFs operating in the first datacenter may be isolated from the VNFs operating in the second datacenter. In some embodiments, the first datacenter may establish the first scrubbed IP domain before the second scrubbed IP domain is constructed for the second datacenter. In an embodiment, the datacenter 120A may be considered to be a first datacenter and the datacenter 120N may be considered to be a second datacenter. As such and as illustrated in FIG. 1B, in an embodiment, the first scrubbed IP domain may correspond with a scrubbed IP domain 140A and the second scrubbed IP domain may correspond with a scrubbed IP domain 140N, such as illustrated with respect to FIG. 1B. In some embodiments, one or more aspects of the operations and embodiments discussed herein can be implemented for using an instance of the DSS 160 assigned to the first scrubbed IP domain to clean, scrub, and create the second scrubbed IP domain for the second datacenter, despite the second datacenter not having access to the VNFs and traffic flows directed to the first scrubbed IP domain (and thus directed to any virtual applications within the first scrubbed IP domain). For example, the scrubbing service 130 can be used to detect (i.e., drop, filter, purge, and/or otherwise make undeliverable) traffic flows directed towards a first scrubbed IP domain which is only accessible to internal VNFs of the first datacenter. The scrubbing service can analyze and compare the traffic flows to other traffic flows that are directed to the second datacenter and any VNFs (e.g., virtual tenant applications) that are isolated to the second datacenter. In this example, the scrubbing service 130 can detect any operator configuration errors by monitoring traffic flow to the second datacenter, and in turn configure an instance of the DSS 160 that is to be specifically applied to traffic flows directed towards the second datacenter (and thus a scrubbed IP domain that is constructed for the second datacenter). For example, the scrubbing service 130 can detect that the operational configuration of the second datacenter has permitted traffic flows that have and/or otherwise correspond with uni-directional messages, and in turn determine that this may trigger and/or otherwise indicate errors (e.g., full firewall logs, diminished compute resource availability, etc.). As such, the scrubbing service can configure an instance of the DSS 160 for the second datacenter so as to generate a second scrubbed IP domain that instructs one or more of the designated scrubbing points to scrub and not deliver un-directional messages to the second datacenter. Two or more scrubbed IP domains can be maintained and support each other by blocking traffic flows that are directed to each respective datacenter and scrubbed IP domains, without each datacenter having access to the VNFs operating, executing, and/or corresponding to the publicly routable IP addresses associated with each respective scrubbed IP domain. As such, the present disclosure can cause the operations and functioning of the computing systems and network devices of various datacenters to be improved. It is understood that the concepts and technologies discussed herein improve the functioning of particular computing systems by solving technical challenges that arise because of, and specifically within, the realm to network technology pertaining to datacenters and networks. It is understood that the examples provided are for illustration purposes only, and therefore should not be construed as limiting in any way.

Turning now to FIG. 1B, with continued reference to FIG. 1A, an example of operating environment 100' is illustrated, according to an illustrated embodiment. The operating environment 100' can be another embodiment to providing an instance of the scrubbing service 130 that supports one or more instances of a scrubbed internet protocol domain, such as the scrubbed IP domain 140A and the scrubbed IP domain 140N. Elements of the operating environment 100' illustrated in FIG. 1B may share numbering that is found in the FIG. 1A. For clarity purposes, like-numbered elements can be considered to be the same and/or at least similar to an instance of the element discussed with respect to FIG. 1B, and therefore an explanation of an embodiment of the like-numbered element is found in the discussion above and will not be repeated herein.

In an embodiment of the operating environment 100', the scrubbing service 130 may be provided via a plurality of scrubbing clients (e.g., instances of the scrubbing client 152) that are instantiated on carrier-grade routers, such as the IGRs 116A-N. As such, the IGRs 116A-N can be configured to provide machine learning for filtering unwanted traffic, and thus scrub probe traffic flows. Traditionally, carrier-grade routers may attempt to implement a static access control list. However, for reasons discussed above, the static access control lists may not detect dynamically changing probe traffic. As such, in some embodiments, aspects of the present disclosure can provide carrier-grade routers that have instances of the scrubbing client 152 that can be configured as machine-learning modules which can communicate with other instances of the scrubbing client on other devices inside the SPN 114 and/or external to the SPN 114 (e.g., scrubbing clients at one or more of the Tier 1 ISP networks 110A-N). In some embodiments, one or more network devices of the present disclosure may implement a Border Gateway Protocol Flow Specification, referred to as BPG Flowspec as defined by a standard of the Internet Engineering Task Force. One of ordinary skill in the technology understands that a BGP Flowspec mechanism does not allow for feedback about scrubbed traffic on the device to be sent (directly) to other devices that are implementing the BGP Flowspec. Aspects of the present disclosure can provide instances of the scrubbing client 152 that identify and generate traffic flow records (e.g., traffic flow records discussed with respect to FIG. 2) that can be analyzed and/or otherwise provided as feedback and input to instances of the scrubbing client 152 on other network devices that collectively provide the scrubbing service 130. As such, the scrubbing service 130 can directly convey detected probe traffic flow characteristics between two or more instances of the scrubbing client 152 so as to match against incoming probe traffic and provide instructions for operations to perform at a particular designated scrubbing point via an updated and/or reconfigured DSS 160, where scrubbing actions may include dropping probe traffic, rerouting flow traffic (e.g., to another designated scrubbing point despite the current designated scrubbing point detecting that the probe traffic could be scrubbed prior to being resource to the next hop), rate-limiting the probe traffic, implementing a scrubbing sequence along the network path, or the like. Therefore, network devices that implement the scrubbing client 152 (e.g., the IGRs 116A-N) are configured to enable bi-directional communication between instances of the scrubbing client 152 and therefore can provide feedback about scrubbed probe traffic to the designated scrubbing points that provide the scrubbing service 130.

Therefore, in an embodiment, instances of the scrubbing client 152 can be configured to provide machine learning and can be embedded in carrier-grade peering routers, such as the IGRs 116A-N. Instances of the scrubbing client 152 can be distributed across the carrier-grade peering routers in the SPN 114 and can communicate among themselves to dynamically scrub probe traffic that is detected within the SPN 114 and/or the datacenters 120A-N. In some embodiments, some traffic flows may be flagged as potential probe traffic and may be rerouted (and/or quarantined) for supplemental validation and/or authorization to proceed (e.g., in response to input from a network operator), while other traffic flows that are potential probe traffic may be scrubbed and thus dropped at a particular designated scrubbing point along the network path.

In an embodiment, an instance of the scrubbed IP domain (e.g., any of the scrubbed IP domains 140A-N) can be maintained by implementing an always on dynamic scrubbing scheme, such as an instance of the DSS 160 that is always active and scrubbing probe traffic at various instances of designated scrubbing points. By this, the machine learning and dynamic scrubbing can be implemented within the SPN 114 and/or the datacenters 120A-N without requiring that every peering router be a part of the scrubbing service 130. For example, in some embodiments, instances of detected probe traffic flow that are targeted and/or otherwise destined for a scrubbed IP domain (and thus a publicly routable IP address and/or a scrubbed IP subnet) can be redirected and routed through a scrubbing complex 180 of the SPN 114. In some embodiments, the scrubbing complex 180 can include a plurality of scrubbing clients (e.g., instances of the scrubbing client 152) that are hosted by the SPN 114 and dedicated to supporting the scrubbing service in an always-on configuration. As such, the scrubbing complex 180 can provide scrubbing of detected probe traffic based on the scrubbing clients 152 of the scrubbing complex 180 directly communicating with the datacenters 120A-N and/or a customer network 182, which in some embodiments can provide an instance of the scrubbing client 152 that monitors for and/or scrubs any probe traffic that manages to reach the datacenters 120A-N and/or the customer network 182. In an embodiment, the scrubbing client 152 may be instantiated on a customer premise equipment of the customer network.

In another embodiment, an instance of the scrubbing complex 180 can be configured to be always-on and may operate concurrent with instances of the scrubbing client 152 distributed throughout the SPN 114 and/or the datacenters 120A-N. For example, attributes of detected probe traffic that is to be scrubbed at the scrubbing complex 180 can be provided to the scrubbing complex 180 by instances of the scrubbing client 152 outside of the scrubbing complex 180 but within the SPN 114 (e.g., any of the scrubbing clients 152 that reside and implement the DSS 160 at the IGRs 116A-N and/or the ARs 118A-N). In some embodiments, at least some probe traffic that is detected by designated scrubbing points of the SPN 114 may not be routed to the scrubbing complex 180, but rather can proceed to a datacenter (e.g., any of the datacenters 120A-N), where the designated scrubbing points of the scrubbing service 130 within the datacenter can be instructed to provide the scrubbing of probe traffic (e.g., instances of the cloud gateway 122 and/or the VRs 126A-N). In some embodiments, traffic flows that are destined and/or targeted for the scrubbed IP domain 140 may be (re)routed and/or handled using BGP route injection, although this may not necessarily be the case. In various embodiments, the scrubbing service 130 can operate and support scrubbing of probe traffic irrespective of whether the probe traffic is a part of an attack, such as a Distributed Denial of Service Attack, a Denial of Service Attack, or any other attack against the SPN 114, the datacenters 120A-N, any element therein, or any other device and/or application.

FIGS. 1A and 1B illustrate one or more instances of the UE 101, the network 102, the network access point 103, the source IP address 104, the source device 105, the valid traffic flow 106, the botnet 107, the probe traffic flow 108, the Tier 1 ISP network 110A-N, the dynamic traffic flows 112A-N, the SPN 114, the IGRs 116A-N, the ARs 118A-N, the datacenters 120A-N, the cloud gateway 122, the host compute nodes 124A-N, the VRs 126A-N, the VMs 128A-N, the scrubbing service 130, the exposed application 132, the sandbox 133, the virtual tenant applications 134A-N, the scrubbed IP subnets 136A-N, the publicly routable IP addresses 138A-N, scrubbed IP domain 140, the configuration input 146, the observation time period 148, the application server 150, the scrubbing client 152, the blocked probe traffic flows 154A-G, the network path 156, the network path 157, the network path 158, the network path 159, the DSS 160, the virtual tenant request 162, the isolated path 164, and the configuration message 166, the scrubbing complex 180, and the customer network 182. It should be understood, however, that some implementations of the operating environment 100 can include zero, one, or more than one instances of these elements of the operating environment 100 shown in FIG. 1A and/or the operating environment 100' shown in FIG. 1B. As such, the illustrated embodiment of the operating environment 100 and the operating environment 100' should be understood as being illustrative, and should not be construed as being limiting in any way.

Turning now to FIG. 2, with continued reference to FIGS. 1A and 1B, a block diagram 200 for establishing and maintaining a scrubbed internet protocol domain is provided, according to an illustrative embodiment. The block diagram 200 includes a scrubbing policy engine ("SPE") 202 that can be executed by a computer system and/or a network device (e.g., the application server 150 and/or any other device and/or computer system discussed with respect to the operating environment 100). In various embodiments, the SPE 202 can implement and execute a machine learning routine, such as an instance of the cluster process discussed above with respect to FIG. 1A. The SPE 202 can be implemented to support the scrubbing service 130. In various embodiments, an instance of the DSS 160 can be generated and/or (re)configured based on various input of data points so as to enable dynamic detection of probe traffic to facilitate construction and/or maintenance of the scrubbed IP domain 140.

In some embodiments, input from various devices of the SPN 114 (e.g., the IGRs 116A-N and/or the ARs 118A-N) and/or the datacenters 120A-N (e.g., the VRs 126A-N and/or the cloud gateway 122) can be provided to the SPE 202. For example, in some embodiments, the SPE 202 can receive a first traffic flow record set ("first set") 204. The first set 204 can include a plurality of traffic flow records, such as traffic flow records 206A-N. The traffic flow records 206A-N can be generated by devices of the SPN 114 and identify traffic flows that are handled and/or routed from, to, and/or within the SPN 114. In some embodiments, the traffic flow records 206A-N can include information about a particular instance of a traffic flow, such as but not limited to, 5-tuple information discussed above with respect to FIG. 1A, the frequency of probe traffic flows traversing the particular device, and any other information (e.g., information discussed below with respect to dynamic traffic parameters). In some embodiments, the SPE 202 can receive a second traffic flow record set ("second set") 205. The second set 205 can include a plurality of traffic flow records, such as traffic flow records 208A-N. The traffic flow records 208A-N can be generated by devices of the datacenters 120A-N and identify traffic flows that are handled and/or routed from, to, and/or within the datacenters 120A-N.

In various embodiments, the records provided by the first set 204 and/or the second set 205 can include data points about a traffic flow, where the data points identify information corresponding to one or more dynamic traffic parameters, such as dynamic traffic parameters 210. In some embodiments, the SPE 202 can be provided by one or more instances of the dynamic traffic parameters 210 for input and to serve as a basis for the generation of the DSS 160. For example, the first set 204 and the second set 205 may include information from traffic flows such as specific UDP/TCP server ports, and analysis using particular attributes provided by the dynamic traffic parameters 210 can be used to reveal whether the traffic flow is (and/or exhibits traits of being) a valid traffic flow and/or a probe traffic flow. One or more instances of a traffic flow record of the first set 204 and/or the second set 205 can include information associated with the dynamic traffic parameters 210. The dynamic traffic parameters 210 can include, but should not be limited to, a source IP address, destination IP address, a source port identifier (which can provide a number), a destination port identifier (which can provide a number), a protocol identifier (which can indicate a protocol in use at the time of the traffic flow detection), the number of in-out packets, the number of in-out bytes, number of periods that the traffic flow was active, the country of origin for the traffic flow, the identifier of the peering router which sent the traffic flow to the device that created the record (i.e., the entering peering router identifier), the time of day for the traffic flow activity (e.g., a timestamp and/or date indicator), and/or any other information about a traffic flow. As illustrated in FIG. 2, the dynamic traffic parameters 210 can be provided to the SPE 202 along the path 3, and an observation time period 212 can be input to the SPE 202 along the path 4.

In some embodiments, the SPE 202 can identify the observation time period 212, where the observation time period 212 can define the length of time (e.g., in minutes and/or seconds) in which traffic flows should be recorded and/or analyzed and information is provided so as to provide machine learning and tuning of the configuration for the DSS 160. In various embodiments, the observation time period 212 can correspond with the observation time period 148 discussed with respect to FIG. 1A. In some embodiments, additional input can be provided to the application server 150, such as validation parameters 218. In some embodiments, the validation parameters 218 can include configuration input 214 and/or external source information 216. The configuration input 214 can include traffic flow validation input, scrubbing point indicators, probe traffic indicators, and other information. The traffic flow validation input can correspond to input that selects, identifies, and/or confirms that certain instances of traffic flows should be allowed to proceed to a virtual machine (e.g., traffic flows from a known source), and in some embodiments, the traffic flows may be permitted to be delivered even if the traffic flow is a probe traffic flow. A scrubbing point indicator can include an identifier of a network device and/or computer system that should be designated as a scrubbing point, such as designated scrubbing points 226A-N, that should be used to implement the scrubbing service 130 within the SPN 114 and/or the datacenters 120A-N. The designated scrubbing points 226A-N can include any of the IGRs 116A-N, the ARs 118A-N, the cloud gateway 122, and/or the VRs 126A-N. The designated scrubbing points 226A-N can be assigned from any network device and/or computer system that handles and/or can instruct the handling of a traffic flow that is within the SPN 114 and/or the datacenters 120A-N. The probe traffic indicators can provide information corresponding to the types of communications that are indicative of probe traffic, such as a ping request and/or any other type of message that attempts to gain information about the datacenters 120A-N, the VMs 128A-N, the virtual tenant applications 134A-N, and/or any other element associated with the publicly routable IP addresses 138A-N associated with the scrubbed IP domain 140.

The external source information 216 can include botnet domain information, malware domain information, and other information. The external source information 216 may include known source IP addresses and/or source ports that correspond to instance of probe traffic flows. In various embodiments, the validation parameters 218 can include any information that is used to identify valid traffic flows and distinguish from probe traffic flows so that probe traffic flows can be flagged and/or scrubbed at different points along a network path, such as at one of the designated scrubbing points 226A-N.

In various embodiments, the SPE 202 can generate, create, and/or (re)configure an instance of the DSS 160. In some embodiments, a separate instance of the DSS 160 may be generated for a particular instance of the scrubbed IP domain 140. In various embodiments, at least one instance of the DSS 160 can be implemented to establish, support, and/or maintain an instance of the scrubbed IP domain 140.

In various embodiments, the SPE 202 can generate an instance of the DSS 160 by creating a dynamic probe traffic map 220, such as seen along path 5 of FIG. 2. In some embodiments, the dynamic probe traffic map 220 can identify various traffic categories by which the SPE 202 can collect and group data point inputs for various analysis. The traffic categories can correspond to clusters of information about particular traffic flows, and therefore analysis about a particular parameter can be provided so that detection of probe traffic can occur in a manner that is specifically tuned to the traffic flows seen by the SPN 114 and/or the datacenters 120A-N and targeting the scrubbed IP domain 140. In some embodiments, the dynamic probe traffic map 220 can include instances of a probe traffic pointer, where a probe traffic pointer can correspond to instance of a traffic flow record. In various embodiments, a cluster of traffic flows can be created for each of the traffic categories, and therefore the traffic categories can include a plurality of the probe traffic pointers so identify which instances of a traffic flow record correspond to a particular cluster being analyzed. The dynamic probe traffic map 220 can include any other information that facilitates the creation of the DSS 160.

In various embodiments, the SPE 202 can use an executable machine learning routine, such as a clustering process, to categorize traffic flows into valid traffic and/or probe traffic based on various flow parameters, records from other network devices, and any other input (e.g., the first set 204, the second set 205, the dynamic traffic parameters 210, the observation time period 212, the validation parameters 218, the configuration input 214, and/or the external source information 216, etc.). As such, any network device that receives, handles, and/or has access to traffic flows traversing the SPN 114, the datacenters 120A-N, and/or an instance of a customer network (e.g., the customer network 182 discussed with respect to FIG. 1B) can be used to provide the input of data points so as to generate an instance of the DSS 160. In some embodiments, the SPE 202 can execute a machine learning routine (e.g., a clustering process) so that each protocol receives separate analysis, that is the instances of the traffic flows which correspond to a particular protocol (e.g., User Datagram Protocol and/or Transmission Control Protocol) can be collated and analyzed to facilitate detection of probe traffic for each protocol. In some embodiments, the SPE 202 can execute a machine learning routine on traffic flows that are collated and collected for specific server ports (e.g., UDP ports and/or TCP ports), thereby enabling the creation of another cluster for analysis so as to distinguish between valid and probe traffic. In some embodiments, an instance of the dynamic probe traffic map 220 can be used to generate instances of the DSS 160, such as illustrated by proceeding along the path 6 to the DSS 160.

In some embodiments, an instance of the DSS 160 can be generated and implemented to establish and/or maintain an instance of the scrubbed IP domain 140. In some embodiments, the DSS 160 can include an isolated path identifier 222 that can identify the routing path that should be established to route traffic flows to the exposed application 132, such as an identifier corresponding to the isolated path 164. The DSS 160 can include and/or indicate designated scrubbing points, such as the designated scrubbing points 226A-N, that can support, establish, and/or maintain the scrubbing service 130 and a scrubbed IP domain. Each designated scrubbing point can correspond with a particular network device and/or function within the SPN 114 and/or the datacenters 120A-N, and therefore the DSS 160 can provide an identifier of the particular device that should be designated as a scrubbing point for the scrubbing service 130. For example, the designated scrubbing points 226A-N can correspond to at least one designated device identifier, such as any of designated device identifiers 228A-N. The designated device identifiers 228A-N can identify and/or otherwise be associated with any device, computer system, and/or function that can support the scrubbing service 130, such as but not limited to any of the IGRs 116A-N, the ARs 118A-N, the cloud gateway 122, the VRs 126A-N, any other network node of the SPN 114 and/or the datacenters 120A-N.

In various embodiments, the DSS 160 can include dynamic instructions, such as dynamic scrubbing instructions 230. The dynamic scrubbing instructions 230 can include commands that instruct the designated scrubbing points 226A-N to perform one or more operations for establishing and/or maintaining an instance of the scrubbed IP domain 140 and implement the scrubbing service 130. In various embodiments, the scrubbing service 130 may be implemented by instantiating an instance of the scrubbing client 152 on one of the designated scrubbing points 226A-N. The DSS 160 can implement an instance of the dynamic scrubbing instructions 230 via an instance of the scrubbing client 152 so as to provide scrubbing of probe traffic. In some embodiments, the dynamic scrubbing instructions 230 can include active filtering rules, inactive filtering rules, filtering time period, and/or other information. The instructions corresponding to the active filtering rules can instruct an instance of the designated scrubbing point (e.g., via the scrubbing client 152) to continue implementation of rules and/or parameters for detecting probe traffic and scrubbing probing traffic. The inactive filtering rules can provide instruction to a particular designated scrubbing point (e.g., via the scrubbing client 152) to determine which filtering rules have not been used by the designated scrubbing point for a defined amount of time (e.g., as defined by the filtering time period), and therefore are considered to be inactive. In turn, the designated scrubbing point can be instructed to remove and purge the inactive filtering rules from the scrubbing client of the designated scrubbing point. This can alleviate and/or otherwise reduce the amount of traffic flow filtering rules that a particular scrubbing point maintains, and in turn can enable the scrubbing service 130 to configure the DSS 160 so as to scale up and match very large dynamic botnets that change their probe traffic characteristics to avoid detection by static filtering rules. As such, the dynamic scrubbing instructions 230 can use application programming interfaces to configure one or more filtering policies on designated scrubbing points (e.g., the IGRs 116A-N, the ARs 118A-N, the VRs 126A-N, and/or the cloud gateway 122) so as to periodically remove inactive rules. Examples of a rule (e.g., active and/or inactive rules) that can facilitate scrubbing of probe traffic can include monitoring for any combination of the dynamic traffic parameters 210 that indicate probe traffic. In some embodiments, input to the SPE 202 may initially be provided by the exposed application 132, and therefore the active filtering rules may be initially based on traffic flows that exhibit dynamic traffic flow parameters which the exposed application 132 detects as corresponding with probe traffic. Through the SPE 202 implementing machine learning, such as a machine learning clustering process, multiple iterations of feedback (e.g., traffic flow records) from the exposed application 132 and/or the designated scrubbing points 226A-N can reconfigure and/or tune the DSS 160 so that dynamic probe traffic can be detected and scrubbed prior to reaching the VMs 128A-N of the scrubbed IP domain 140.

In some embodiments, the DSS 160 can include and/or define a scrubbing sequence, such as the scrubbing sequence 224. In some embodiments, the scrubbing sequence 224 may be referred to as a cascade scrubbing sequence and/or a distributed scrubbing sequence. For example, in some embodiments, a particular designated scrubbing point from among the designated scrubbing points 226A-N may be instructed to monitor, analyze, record, and/or detect information about probe traffic flows without automatically scrubbing the detected probe traffic upon detection. In some embodiments, the DSS 160 may create the scrubbing sequence 224 so that each designated scrubbing point does not become overloaded by attempting to scrub probe traffic in every circumstance immediately upon detection, but rather can, in some embodiments, rely on (and/or defer to) a designated scrubbing point that is downstream on the network path, and thus the downstream scrubbing point can be used to provide scrubbing of the probe traffic. For example, the scrubbing sequence 224 may define a maximum amount of resources and/or time that is permitted to be spent on scrubbing probe traffic along a network path. In some embodiments, the application server 150 can determine how often a particular designated scrubbing point is active to scrub probe traffic, and if a particular scrubbing point is scrubbing beyond a maximum threshold, then the DSS 160 can use the scrubbing sequence 224 to instruct and/or authorize the particular designated scrubbing sequence to allow a detected probe traffic flow to pass through the network path onto the next hop, specifically by establishing the network path that routes the detected probe traffic to another designated scrubbing device that has capacity to scrub the probe traffic prior to reaching the VMs 128A-N for the scrubbed IP domain 140. In various embodiments, an instance of the DSS 160 can be revaluated by the application server 150, and therefore undergo a refining and/or reconfiguration by the application server 150 obtaining an instance of the DSS 160 that is being implemented for a particular scrubbed IP domain, such as shown by path 7 of FIG. 2. In some embodiments, the DSS 160 can be provided to the network devices and/or computer systems of the SPN 114 and/or the datacenters 120A-N that are assigned to support a particular instance of the scrubbed IP domain 140 and the scrubbing service 130, such as shown by path 8 and path 9 in FIG. 2. The process of refining, reconfiguring, and/or maintaining the scrubbing service 130 and/or the scrubbed IP domain 140 can be repeated by performing iterations of one or more operations discussed herein. It is understood that the examples provided are for illustration purposes only, and therefore should not be construed as limiting in any way.

Figure 3A:
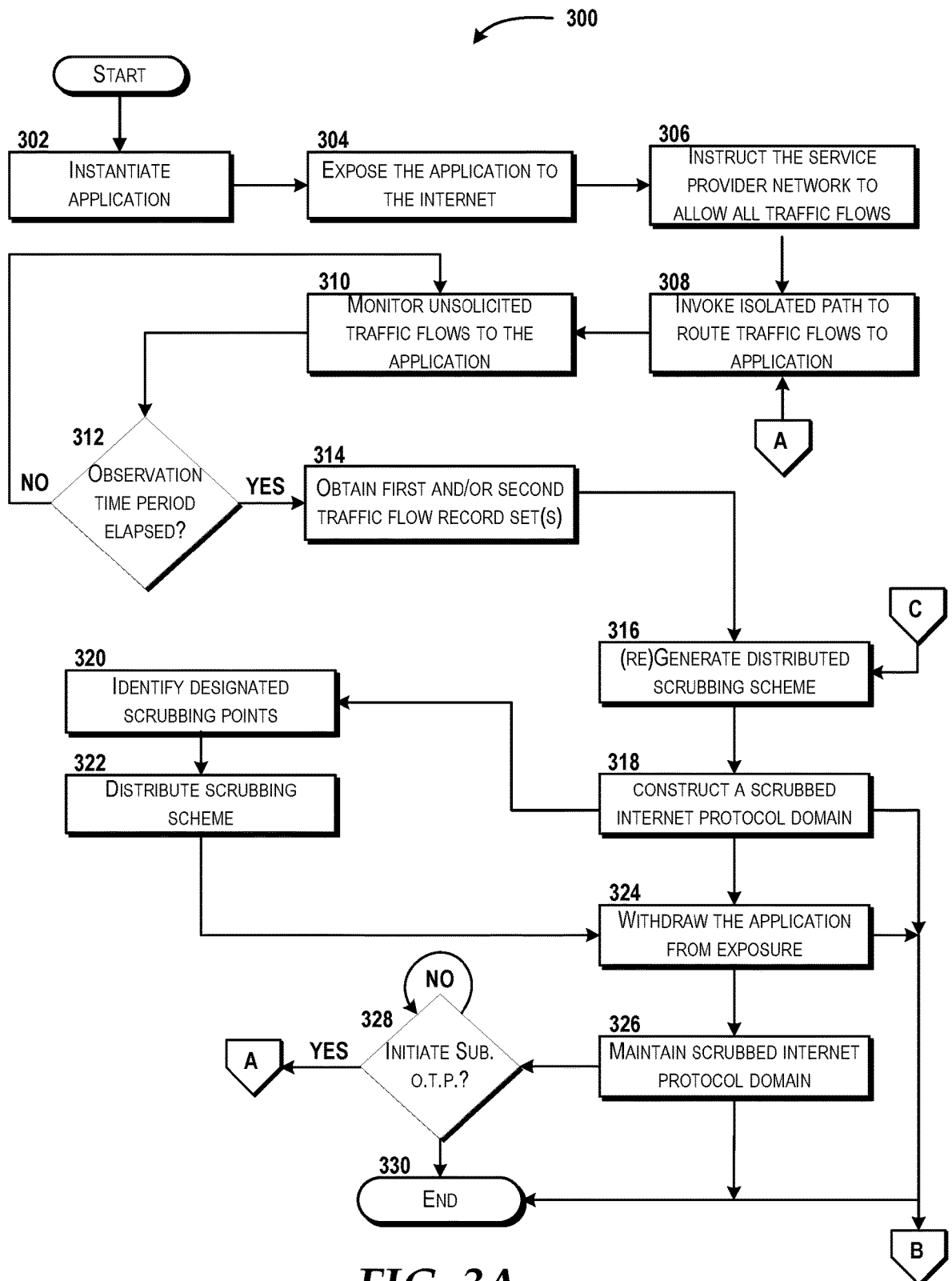
FIG. 3A is a flow diagram illustrating aspects of a method for providing a scrubbed internet protocol domain for enhanced cloud security, according to an illustrative embodiment, according to an illustrative embodiment.
Figure 3B:
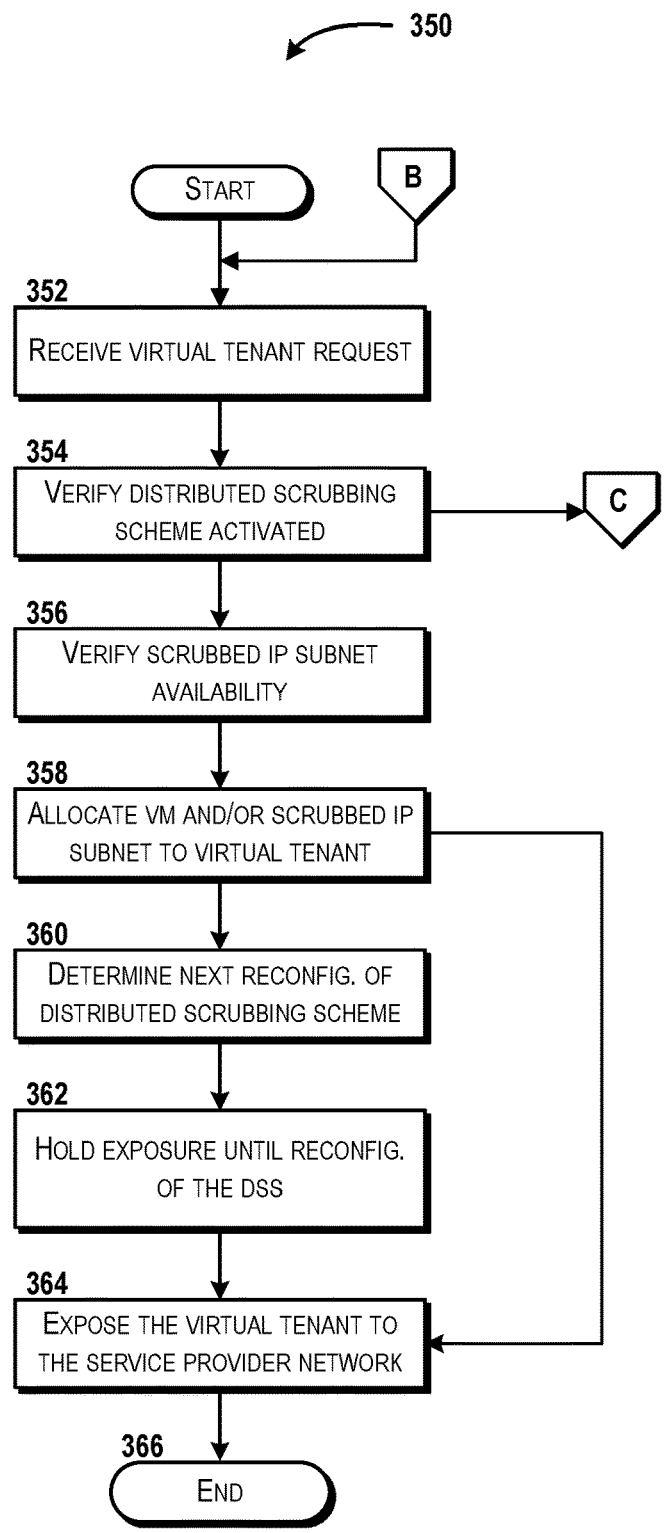
FIG. 3B is a flow diagram illustrating aspects of a method for supporting and maintaining a scrubbed internet protocol domain for enhanced cloud security, according to an illustrative embodiment, according to an illustrative embodiment.
Figure 4:
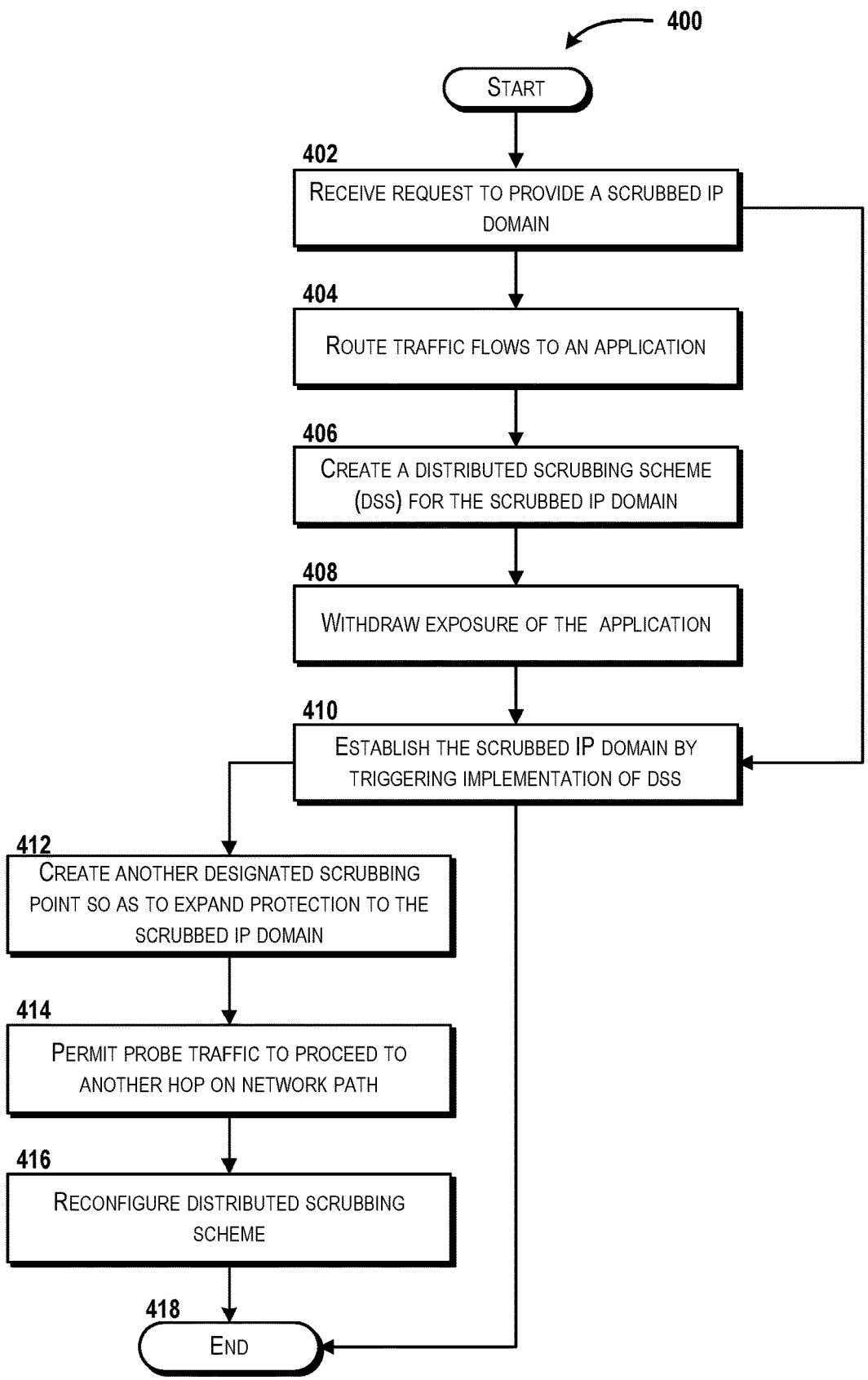
FIG. 4 is a flow diagram illustrating aspects of another method for utilizing a carrier-grade router to support a scrubbed internet protocol domain for enhanced cloud security, according to an illustrative embodiment, according to an illustrative embodiment.

Turning now to FIGS. 3A, 3B, and 4, with continued reference to FIGS. 1A, 1B, and 2, aspects of a method 300, a method 350, and a method 400 for providing a scrubbed IP domain will be described in detail, according to illustrative embodiments. It should be understood that each of the operations of the one or more methods disclosed herein (e.g., the method 300, the method 350, and/or the method 400 discussed below) are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, application modules, program modules, programs, components, data structures, algorithms, and the like. It is understood that use of the term "module" refers to a defined, callable set of computer-readable instructions that provide the performance of one or more operations and functions discussed herein so as to transform, upon execution, processing resources and/or memory resources into a particular, non-generic, machine. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing and transforming a processor of a computing system or device, such as any element within the datacenters 120A-N and/or the SPN 114 (e.g., application server 150, the host compute nodes 124A-N, the IGRs 116A-N, the ARs 118A-N, the cloud gateway 122, the VRs 126A-N) to perform one or more operations and/or causing the processor to direct other components of the computing system and/or device of an operating environment to perform one or more of the operations.

For purposes of illustrating and describing the concepts of the present disclosure, the methods disclosed herein are described as being performed by one or more instance of a computer system (e.g., (e.g., application server 150, the host compute nodes 124A-N, the IGRs 116A-N, the ARs 118A-N, the cloud gateway 122, the VRs 126A-N) via execution of one or more computer executable instructions (i.e., executable data processes that instruct and transform a processor) such as, for example, the scrubbing service 130, the DSS 160, and/or the scrubbing client 152 that configure one or more processors of the computer system and/or network device. It should be understood that additional and/or alternative devices and/or network elements can, in some embodiments, provide the functionality described herein via execution of one or more modules, applications, and/or other software including, but not limited to, the other instances of a computer system within and/or outside the datacenter 110. Thus, the illustrated embodiments are illustrative, and should not be viewed as being limiting in any way. The methods 300, 350, and/or 400 will be described with reference to one or more of the FIGS. 1A, 1B, and 2.

Turning now to FIG. 3A, with continued reference to FIGS. 1A, 1B, and 2, the method 300 for establishing and maintaining a scrubbed IP domain for enhanced cloud security is provided, according to an embodiment. In an embodiment, the method 300 may be performed by a carrier-grade peering router, such as an instance of one of the IGRs 116A-N. In some embodiments, another computer system and/or node of the SPN 114, an instance of the Tier 1 ISP network 110A-N, and/or the datacenters 120A-N (e.g., the application server 150, the host compute nodes 124-N, etc.) can be used to perform one or more operations discussed herein. In some embodiments, the application server 150 can implement the scrubbing service 130 such that one or more operations of the method 300 are performed within the operating environment 100. The method 300 can begin and proceed to operation 302, where the scrubbing service 130 can instantiate an instance of the exposed application 132 within a datacenter (e.g., any of the datacenters 120A-N) so as to initiate identification of traffic flows to the datacenter and detection of probe traffic from among the traffic flows. It is understood that the exposed application 132 may not always be "exposed" (i.e., assigned a publicly routable IP address), and thus use of the phrase "exposed application" refers to an application that can be exposed to all traffic flows (including probe traffic flow) that otherwise may have been scrubbed and/or dropped. In some embodiments, the instance of the exposed application 132 can be isolated to execute from an instance of the sandbox 133 that can be provide by the datacenter. In some embodiments, the datacenter, such as the datacenter 120A, provides a plurality virtual machines via one or more host nodes, such as any of the VMs 128A-N supported by at least one of the host compute nodes 124A-N. In some embodiments, the exposed application 132 and the sandbox 133 execute independent from the VMs 128A-N, but may be assigned to intercept traffic flows that are directed to any of the VMs 128A-N. In various embodiments, one or more (or each) of the VMs 128A-N can operate so as to be publicly routable using a globally unambiguous address that is unique to the one or more VMs 128A-N, such as through the use of one or more of the publicly routable IP addresses 138A-N assigned to one or more of the VMs 128A-N. As such, in some embodiments, one or more of the VMs 128A-N may not be considered to operate within a virtual private network, although this may not necessarily be the case. It is understood that the examples provided are for illustration purposes only, and therefore should not be construed as limiting the possibility of embodiments.

From operation 302, the method 300 can proceed to operation 304, where the scrubbing service 130 can expose the exposed application 132 to the SPN 114 that provides an internet connection, and thus provides the exposed application 132 with external (i.e., outside of the datacenters 120A-N and the SPN 114) internet protocol connectivity to devices outside the datacenters 120A-N. In various embodiments, the exposed application 132 can be provided by an instance of the datacenter that communicates with the SPN 114 so as to facilitate public connectivity and accessibility. In various embodiments, the exposed application 132 can be exposed to the SPN 114 by assigning a publicly routable IP address (e.g., any of the publicly routable IP addresses 138A-N) so as to cause the exposed application 132 to be publicly accessible and globally advertised (i.e., advertised via the internet connection 111 to devices external to the SPN 114). An instance of the publicly routable IP addresses 138A-N provides a globally unique address space, and therefore each of the publicly routable IP addresses 138 is unique outside of the datacenter and within the datacenter. The publicly routable IP addresses 138A-N that are protected from probe traffic by the scrubbing service 130 can form an instance of the scrubbed IP domain 140. As such, any host that is assigned to one of the publicly routable IP addresses 138A-N from the scrubbed IP domain 140 (e.g., any of the VMs 128A-N, the host compute nodes 124A-N, the sandbox 133, etc.) can communicate with other public hosts and/or private hosts inside a datacenter that supports the scrubbing service 130 (i.e., other physical and/or virtual devices that use a publicly routable IP address and/or private addresses within any of the datacenters 120A-N), and can communicate with other public hosts that do not operate from an instance of the scrubbed IP domain 140 and thus are external to any of the datacenters 120A-N associated with the scrubbing service 130 (e.g., other computer systems that can be accessed via an internet connection but are not operating within an instance of the scrubbed IP domain 140 and may not be associated with the scrubbing service 130).

From operation 304, the method 300 can proceed to operation 306, where the scrubbing service 130 can instruct the SPN 114 to automatically allow all traffic flows to be routed to the exposed application 132 during the observation time period 148. For example, the scrubbing service 130 can, in some embodiments, identify network nodes of the SPN 114 and/or the datacenters 120A-N that handle traffic flows from one or more internet connections, such as from any of the Tier 1 ISP networks 110A-N. The scrubbing service 130 can identify network nodes that can potentially serve as designated scrubbing points, such as but not limited to, at least one of a carrier-grade router (e.g., any of the IGRs 116A-N), an access router (e.g., any of the ARs 118A-N), a virtual router (e.g., any of the VRs 126A-N), and/or a cloud gateway (e.g., the cloud gateway 122). The observation time period 148 can establish a defined interval of time in which at least some, or in some embodiments all, traffic flows—that originate external to the SPN 114 and are directed to the exposed application 132, specifically the publicly routable IP address assigned to the exposed application 132—are permitted to be routed to the exposed application 132, which can be executing in the sandbox 133 that confines operations of the exposed application 132 to the sandbox 133. In some embodiments, the exposed application 132 may not be able to communicate with any other VMs 128A-N directly so as to contain any potentially nefarious attacks and/or threats to the sandbox 133. The exposed application 132 and/or the sandbox 133 can report, to the scrubbing service 130 provided by the application server 150 and/or another designated device, what traffic flows were received by and/or targeted to the exposed application 132 so as to facilitate and provide the identification of dynamic probe traffic and provide traffic flow records and parameters for input to generate and/or reconfigure the DSS 160. Therefore, in some embodiments, one or more of the designated scrubbing points may authorize the probe traffic to be delivered and routed to the exposed application 132. The exposed application 132 can enable identification of traffic flows (including probe traffic which may be potentially nefarious and/or harmful) that are targeting the exposed application 132 by revealing various attributes of the probe traffic (e.g., the source IP addresses of the probe traffic, country of origin, attributes of a peering router that serves as an entry point to the SPN 114—referred to as an entry point peering router, etc.). As such, the exposed application 132 can facilitate identifying and keeping up to date the dynamically changing attributes of the probe traffic. The traffic flows can be monitored, recorded, identified, and/or analyzed in a dynamic, ongoing manner, while maintaining isolation of the traffic flows to the exposed application 132 and preventing probe traffic flows from reaching and/or otherwise communicating with one or more (or any other) virtual machine, virtual service, virtual application, and/or virtual service provided by a data center.

From operation 306, the method 300 can proceed to operation 308, where the scrubbing service 130 can invoke the isolated path 164 so as to route traffic flows (e.g., any of the dynamic traffic flows 112A-N that can include probe traffic and/or valid traffic) past any intermediary devices (e.g., the cloud gateway 122 that may include a firewall) to the exposed application 132. The isolated path 164 can be provided as a network path from the cloud gateway 122 (that communicates with the SPN 114) to the sandbox 133 that hosts the exposed application 132.

From operation 308, the method 300 can proceed to operation 310, where the scrubbing service 130 can monitor the traffic flows (e.g., any of the dynamic traffic flows 112A-N that can include probe traffic and/or valid traffic) that are directed to (and thus attempts to communicate with and/or reaches) the exposed application 132. The traffic flows can be unsolicited and target the exposed application 132 in response to exposure to the SPN 114. In some embodiments, the monitoring can occur during a defined time interval (e.g., during the observation time period 148) so as to generate input for the generation, update, and/or reconfiguration of the DSS 160, and in turn enables distributed dynamic scrubbing of probe traffic across the SPN 114 and the datacenters 120A-N.

From operation 310, the method 300 can proceed to operation 312, where the scrubbing service 130 can determine whether the observation time period 148 has ended and/or has other elapsed. In some embodiments, if time remains for the observation time period 148, then traffic flows can continue to be routed to the exposed application 132 and, in turn, the method 300 may proceed along the NO path to operation 310 discussed above where the traffic flows to the exposed application 132 can continue to be monitored. In some embodiments, if the scrubbing service 130 determines that the observation time period 148 has elapsed, then the method 300 may proceed along the YES path to operation 314.

At operation 314, the scrubbing service 130 can collect any information that was detected, identified, recorded, and/or observed based on the traffic flows being routed to the exposed application 132. For example, in some embodiments, one or more instances of traffic flow records (e.g., traffic flow records 206A-N, 208A-N discussed with respect to FIG. 2) and/or any other detected information (e.g., an instance of the dynamic traffic parameters 210) may be created based on monitoring the traffic flows to the exposed application 132 during the observation time period 148. In various embodiments, the traffic flow records (e.g., traffic flow records 206A-N, 208A-N discussed with respect to FIG. 2) and/or any other detected information (e.g., an instance of the dynamic traffic parameters 210) may be created by, and/or on behalf of, any of the network nodes (e.g., any of the designated scrubbing points) of the SPN 114 and/or the datacenters 120A-N that handled the traffic flows during the routing to the exposed application 132. Therefore, in some embodiments, the scrubbing service may obtain a first traffic flow record set (e.g., the first set 204) and/or a second traffic flow record set (e.g., the second set 205) that capture information about the traffic flows that were redirected to the exposed application 132 during the observation time period 148. In some embodiments, information and/or records that were generated by the exposed application 132 and/or the sandbox 133 may be provided to the scrubbing service 130 (e.g., executing on the application server 150) via an instance of the configuration message 166, although this may not necessarily be the case. In some embodiments, each of the designated scrubbing points that handled traffic flows directed to the exposed application 132 can provide traffic flow records and any other information and/or parameters about the traffic flows.

From operation 314, the method 300 can proceed to operation 316, where the scrubbing service 130 can generate a scrubbing scheme, such as an instance of the DSS 160, that can provide policies, instructions, and/or rules by which the designated scrubbing points can detect and scrub probe traffic that is directed to one or more of the publicly routable IP addresses 138A-N of the scrubbed IP domain 140. In some embodiments, the scrubbing scheme (e.g., the DSS 160) can include an instance of the scrubbing sequence 224. For example, the DSS 160 can be generate and configured so as to stagger scrubbing of detected probe traffic across the SPN 114 and/or the datacenters 120A-N, and trigger distributed (in some embodiments non-uniform) scrubbing of probe traffic so as to establish and/or maintain the scrubbed IP domain 140. Specifically, in some embodiments, the DSS 160 can use the scrubbing sequence 224 to instruct a designated scrubbing point to detect probe traffic flows and/or to scrub at least some instances of the probe traffic flows so as to not deliver the probe traffic flows to the virtual machine and/or virtual tenant application associated with the targeted IP address of the probe traffic flow (e.g., one of the publicly routable IP addresses 138A-N.

In an embodiment, the scrubbing sequence 224 can enable a designated scrubbing point to identify the next hop in the network path that is another designated scrubbing point, and despite the probe traffic flow currently being detected (and potentially scrubbed by the scrubbing point that initially detected the probe traffic), the scrubbing sequence 224 can authorize routing of the detected probe traffic downstream to the next (and/or another) hop so as to distribute the scrubbing operations, which can prevent bottlenecks and overload of compute resources. In some embodiments, the DSS 160 can instruct one or more of the designated scrubbing points to remove and/or otherwise purge inactive traffic filtering rules which may continue to be generating traffic logs that do not correspond to currently active probe traffic. By this, the amount of traffic flow records that can be used to iteratively and/or periodically update the DSS 160 can be tuned based on filtering rules and policies that are dynamically created to match changing probe traffic. As such, in some embodiments, the scrubbing of probe traffic may be performed in a non-uniform sequence and/or by forming a network path using different designated scrubbing points so as to establish and/or maintain the scrubbed IP domain 140 by preventing probe traffic from reaching the VMs 128A-N that are associated with the publicly routable IP addresses 138A-N.

From operation 316, the method 300 can proceed to operation 318, where the scrubbing service 130 can construct an instance of the scrubbed IP domain 140 such that detected probe traffic (e.g., one or more instances of the probe traffic flow 108) is prevented from communicating with and/or reaching one or more of the VMs 128A-N that are provided by a datacenter (e.g., any of the datacenters 120A-N). In various embodiments, instances of designated scrubbing points can implement the DSS 160 so as to identify and detect instances of probe traffic flows that are directed to a publicly routable IP address that is associated with the scrubbed IP domain 140. In various embodiments, the scrubbed IP domain 140 can include one or more publicly routable IP addresses (e.g., the publicly routable IP addresses 138A-N). Each of the publicly routable IP addresses 138A-N can have a globally unique IP address, and therefore the publicly routable IP addresses 138A-N can be advertised via the internet connection to devices that are external to the SPN 114 and/or the datacenters 120A-N. As such, the scrubbed IP domain 140 can be protected from receiving detected probe traffic (e.g., instances of the probe traffic flow 108) because probe traffic flows—which are directed to one or more of the publicly routable IP addresses 138A-N associated to the scrubbed IP domain 140—can be scrubbed by designated scrubbing points within the SPN 114 and/or the datacenters 120A-N. In various embodiments, the scrubbed IP domain 140 can be constructed by establishing designated scrubbing points within the SPN 114 and/or the datacenters 120A-N, detecting probe traffic flows via the designated scrubbing points, and scrubbing the detected probe traffic within the SPN 114 and/or the datacenters 120A-N prior to the detected probe traffic reaching the one or more virtual machines that are assigned to a particular IP address that is the target of the detected probe traffic (e.g., any of the publicly routable IP addresses 138A-N). As such, an instance of the scrubbed IP domain 140 can provide a globally unique address space that is protected from probe traffic, while also being publicly routable and advertised to the internet via an internet connection (e.g., an internet connection provided by the SPN 114). Stated differently, an instance of the scrubbed IP domain 140 can provide a publicly available IP address space that include a plurality of IP addresses that are globally unambiguous, and therefore may be reached by non-probe traffic flows (e.g., the valid traffic flow 106). In some embodiments, one or more of the publicly routable IP addresses 138A-N can be reserved for use by (and thus can be assigned and/or allocated to) virtual tenant applications (e.g., any of the virtual tenant applications 134A-N) that subscribe to the scrubbing service 130 and operate as a publicly routable application and/or service that is supported by one or more datacenter (e.g., any of the host compute nodes 124A-N and/or the VMs 128A-N that are allocated and assigned to the particular IP address from the publicly routable IP addresses 138A-N) within the scrubbed IP domain 140. In some embodiments, the publicly routable IP addresses 138A-N may not be configured and/or implemented solely as private addresses because implementation solely as private addresses may not have global meaning outside of the datacenters 120A-N and/or the SPN 114. The publicly routable IP addresses 138A-N can enable global and/or public exposure to devices outside of one or more private networks of the datacenters 120A-N and/or the SPN 114, and as such, advertisement of the publicly routable IP addresses 138A-N may be propagated on external network paths (i.e., network paths external to the datacenters 120A-N and/or the SPN 114), which may be in contrast to private addresses that may not be forwarded, advertised, and/or exposed across any external network paths.

In some embodiments, the method 300 may proceed from operation 318 to operation 330, where the method 300 may end. Returning to operation 318, in some embodiments, the method 300 may proceed to operation 324, which will be discussed below in further detail. In some embodiments, operation 318 can include and/or be supported by one or more operations, such as but not limited to, the operation 320 and/or the operation 322. As such, in some embodiments, the method 300 may proceed from operation 318 to operation 320, where the scrubbing service 130 can identify one or more instances of designated scrubbing points that can be used to detect probe traffic and provide scrubbing of detected probe traffic. For example, in some embodiments, the DSS 160 can include one or more identifiers for potential designated scrubbing points (e.g., the designated device identifiers 228A-N) that can provide one or more network paths to the virtual machines that are assigned to one or more of the publicly routable IP addresses 138A-N for the scrubbed IP domain 140. The scrubbing service 130 may select one or more available network nodes, computer systems, and/or network functions that can service as a designated scrubbing point. In some embodiments, the scrubbing service 130 can provide each designated scrubbing point with an instance of the scrubbing client 152, which can be configured to communicate with other designated scrubbing points, the application server 150, and/or any device that supports the scrubbing service 130. In some embodiments, an instance of the DSS 160 can be provided to an instance of the scrubbing client 152 which can execute instructions so as to implement the scrubbing service 130, support the scrubbed IP domain 140, and prevent probe traffic from being delivered to the one or more VMs 128A-N associated with the scrubbed IP domain 140.

From operation 320, the method 300 can proceed to operation 322, where the scrubbing service 130 can distribute the DSS 160 to one or more designated scrubbing points within the SPN 114 and/or the datacenters 120A-N that correspond to the scrubbed IP domain 140. In some embodiments, an instance of a designated scrubbing point can include at least one of a carrier-grade router (e.g., any of the IGRs 116A-N), an access router (e.g., any of the ARs 118A-N), a virtual router (e.g., any of the VRs 126A-N), or a cloud gateway (e.g., the cloud gateway 122).

From operation 322, the method 300 can proceed to operation 324, where the scrubbing service can withdraw the exposed application 132 from being publicly exposed (i.e., withdraw from being publicly routable and advertised) to the SPN 114 and thus prevent traffic flows from being routed to the exposed application 132. For example, in some embodiments, the scrubbing service can instruct the designated scrubbing points to no longer allow all (and/or any) traffic flows to be routed to the exposed application 132, and thus withdraw the instruction to allow probe traffic flows. In some embodiments, the exposed application 132 can be withdrawn from being publicly routable and/or exposed to the SPN 114 (and thus to the internet) in response to the observation time period 148 elapsing. The exposed application 132 may be exposed and allowed to receive network traffic when an instance of the DSS 160 is scheduled to be updated (e.g., based on information from probe traffic that was detected by the designated scrubbing points) since the last update and/or iteration of the DSS 160. In some embodiments, withdrawal of the exposed application 132 from being exposed to the SPN 114 can include revoking use of the isolated path 164 so as to prevent traffic flows from reaching the sandbox 133 and prevent global advertisement of an IP address for the exposed application 132. In some embodiments, from operation 324, the method 300 may proceed to operation 330, where the method 300 may end. In some embodiments, the method 300 can proceed to operation 326.

At operations 326, the scrubbing service 130 can maintain an instance of the scrubbed IP domain 140. For example, in some embodiments, the scrubbed IP domain 140 can be maintained by identifying inactive filtering rules (e.g., one or more instances of the dynamic scrubbing instructions 230 that provide one or more of the dynamic traffic parameters 210 that should be detected and used to scrub probe traffic flows) which are being implemented on a designated scrubbing device but are not active, and therefore do not currently contribute to scrubbing of probe traffic. In an embodiment, inactive filtering rules may cause congestion of one or more traffic flow records and provide null records that results in data bloat which can impede analysis and detection of information and parameters that are relevant to detecting probe traffic. In some embodiments, maintaining the scrubbed IP domain 140 can include discarding the inactive filtering rules at one or more of the designated scrubbing points within the SPN 114 and/or any of the datacenters 120A-N. In some embodiments, reconfiguration and/or the update of the DSS 160 can define active filtering rules (e.g., via the dynamic scrubbing instructions 230) such that traffic flows which exhibit one or more of the dynamic traffic parameters 210 (and/or other input information discussed with respect to FIG. 2) can be scrubbed prior to delivery to the target IP address (e.g., one or more of the publicly routable IP addresses). In some embodiments, from operation 326, the method 300 may proceed to operation 330, where the method 300 may end.

Returning to operation 326, in some embodiments, the method 300 may proceed from operation 326 to operation 328, where the scrubbing service 130 can determine whether to initiate a subsequent iteration of the observation time period 148 so as to identify the latest iteration of information about detected probe traffic so as to update and/or reconfigure an instance of the DSS 160 that can be distributed to the designated scrubbing points. By this, the scrubbing service 130 can detect probe traffic dynamically without reliance on static and/or manual configuration. Therefore, in some embodiments, if a subsequent iteration of the observation time period 148 should not be initiated, then the method 300 may proceed along the NO path, where the operation 328 may repeat and determination of whether the DSS 160 should be updated can be repeated. In some embodiments, if a subsequent iteration of the observation time period 148 should be initiated, then the method 300 may proceed along the YES path to operation 308, which is discussed above, and one or more operations of the method 300 may repeat. In some embodiments, if a subsequent iteration of the observation time period 148 is in progress and/or has occurred, one or more aspects of the components discussed herein may be updated and/or reconfigured, such as the DSS 160. As such, one or more of the operations discussed above may be repeated so as to maintain the scrubbed IP domain 140. In some embodiments, the method 300 may proceed from operation 328 to operation 330, where the method 300 may end. In some embodiments, the method 300 may proceed to the method 350, where one or more operations may be performed, such as but not limited to, operation 352.

Turning now to FIG. 3B, with continued reference to FIGS. 1A, 1B, 2, and 3A, the method 350 for facilitating a scrubbed IP domain for enhanced cloud security is provided, according to an embodiment. In an embodiment, the method 350 may be performed by a carrier-grade peering router, such as an instance of one of the IGRs 116A-N. In some embodiments, another computer system and/or designated scrubbing point of the SPN 114, an instance of the Tier 1 ISP network 110A-N, and/or the datacenters 120A-N can be used to perform one or more operations discussed herein, such as but not limited to the application server 150, the ARs 118A-N, the cloud gateway 122, the VRs 126A-N, a combination thereof, or any other device and/or computer system that can support the scrubbing service 130.

In some embodiments, the method 350 may be preceded by one or more operations from the method 300, such as but not limited to, operation 318, 326, and/or 328. In various embodiments, the method 350 can begin and proceed to operation 352, where the scrubbing service 130 can receive an instance of the virtual tenant request 162. The virtual tenant request 162 can indicate a request to activate and/or otherwise on-board one or more of the virtual tenant applications 134A-N to a datacenter (e.g., any of the datacenters 120A-N). In some embodiments, the scrubbing service 130 may confirm and/or validate that the scrubbed IP domain 140 has been constructed and established so that an instance of the virtual tenant application is protected from probe traffic upon being on-boarded (i.e., instantiated and activated) on one or more of the VMs 128A-N of the datacenters 120A-N.

From operation 352, the method 350 can proceed to operation 354, where the scrubbing service 130 can verify that the DSS 160 has been activated and implemented such that the scrubbed IP domain 140 is protected from receiving probe traffic flows via the SPN 114 and/or the datacenters 120A-N. For example, the scrubbing service 130 can verify that the DSS 160 is activated by confirming that designated scrubbing points have been established within the SPN 114 and/or the datacenters 120A-N, and that the DSS 160 is being implemented by the designated scrubbing points such that detected probe traffic is scrubbed along the network path. Alternatively and/or additionally, in some embodiments, the scrubbing service 130 can confirm that the DSS 160 is active by determining whether the exposed application 132 is being used such that all traffic flows can reach (and thus be routed to) the exposed application 132 via the isolated path 164. In some embodiments, the scrubbing service 130 can regenerate and/or reconfigure an instance of the DSS 160 prior to a virtual tenant application being on-boarded to one or more of the VMs 128A-N of the datacenters 120A-N, and as such, one or more operations discussed with respect to the method 300 can be implemented, such as the operation 316 discussed above.

From operation 354, the method 350 can proceed to operation 356, where the scrubbing service 130 can verify that a scrubbed IP subnet (e.g., any of the scrubbed IP subnets 136A-N) is available to be assigned and/or allocated to the virtual tenant application and the particular one or more of the VMs 128A-N. For example, the scrubbing service 130 can determine that one or more of the publicly routable IP addresses 138A-N are available for use and/or assignment by the virtual tenant application and the corresponding virtual machine, and in turn the scrubbing service 130 can determine which scrubbed IP subnet corresponds to the available instance of the publicly routable IP address for the scrubbed IP domain 140.

From operation 356, the method 350 can proceed to operation 358, where the scrubbing service can allocate one or more instances of the VMs 128A-N and/or the scrubbed IP subnet (e.g., the scrubbed IP subnet 136A) to the virtual tenant application corresponding to the virtual tenant request 162. In some embodiments, the method 350 may proceed from operation 358 to operation 364, which is discussed below. In other embodiments, the method 350 can proceed to operation 360, which will be discussed first.

At operation 360, the scrubbing service 130 may determine the amount of time that has elapsed since the DSS 160 was updated and/or reconfigured so as to adapt to the dynamically changing probe traffic. In some embodiments, the observation time period 148 may restart periodically, and the scrubbing service 130 may regenerate another, updated and/or otherwise reconfigured instance of the DSS 160 using the newly received traffic flow records and dynamic traffic parameters (along with any other input) that was provided from the designated scrubbing points and/or the exposed application 132. In order to ensure that the virtual tenant application is on-boarded in response to the scrubbed IP domain 140 having the most current protection from probe traffic, the scrubbing service 130 may determine when the next iteration of the DSS 160 will be provided, and wait until that time to enable activation of the virtual tenant application.

From operation 360, the method 350 can proceed to operation 362, where the scrubbing service 130 can hold and/or avoid exposure of the virtual tenant application to the internet until the DSS 160 has been reconfigured and/or updated based on the detected probe traffic that was detected during the most recent instance of the observation time period 148. In some embodiments, the reconfigured instance of the DSS 160 can ensure that the designated scrubbing points are aware that the virtual tenant application(s) should be protected from probe traffic based on being included in the scrubbed IP domain 140. Once the DSS 160 has been reconfigured to account for one or more network paths that lead to the virtual machines that will be allocated to the virtual tenant application, then the scrubbing service can release the hold on the virtual tenant application and/or allow valid traffic flows to reach the virtual tenant application with assurance that detected probe traffic targeting the virtual tenant application will be dropped by the DSS 160 (and thus preventing the probe traffic flows from reaching the virtual tenant application and/or virtual machine of the datacenter).

From operation 362, the method 350 can proceed to operation 364, where the scrubbing service 130 can expose the virtual tenant application to the internet via an internet connection provided by the SPN 114. For example, in some embodiments, the scrubbing service 130 can identify the publicly routable IP address of the scrubbed IP domain 140 that has been allocated to the VM that supports the virtual tenant application. As such, the publicly routable IP address can be advertised via the SPN 114, while continuing to be protected from probe traffic flows by the designated scrubbing points of the scrubbing service 130.

From operation 364, the method 350 can proceed to operation 366, where the method 350 can end.

Turning now to FIG. 4, the method 400 for facilitating a scrubbed IP domain for enhanced cloud security is provided, according to an embodiment. In an embodiment, the method 400 may be performed by a carrier-grade peering router, such as an instance of one of the IGRs 116A-N. In some embodiments, another computer system and/or node of the SPN 114, an instance of the Tier 1 ISP network 110A-N, and/or the datacenters 120A-N can be used to perform one or more operations discussed herein, such as but not limited to the application server 150, the host compute nodes 124A-N, the ARs 118A-N, the cloud gateway 122, the VRs 126A-N, the scrubbing complex 180, a combination thereof, or any other node that can serve as a designated scrubbing point. For illustration purposes only, the method 400 will be described as being performed by a first designated scrubbing point that is configured as a carrier-grade router, such as one of the IGRs 116A-N, according to an embodiment. In some embodiments, a designated scrubbing point may be referred to as a designated scrubbing node.

The method 400 can begin and proceed to operation 402, where a designated scrubbing point (e.g., a carrier-grade router and/or any of the designated scrubbing points 226A-

N) can receive a request to provide and/or otherwise establish a scrubbed IP domain (e.g., an instance of the scrubbed IP domain 140) for one or more of the publicly routable IP addresses 138A-N that can be assigned to a host node and/or virtual tenant, such as one or more of the host compute nodes 124A-N, the VMs 128A-N, and/or the virtual tenant applications 134A-N). In some embodiments, the designated scrubbing point may implement an already-existing instance of the DSS 160 to temporarily protect one or more of the publicly routable IP addresses 138A-N from probe traffic, although this may not necessarily be the case.

From operation 402, the method 400 can proceed to operation 404, where the designated scrubbing point can route incoming traffic flows (e.g., the dynamic traffic flows 112A-N that can include instances of the probe traffic flow 108) to an instance of the exposed application 132 that is instantiated in an instance of the sandbox 133 and reserved for use to detect probe traffic that is targeting the one or more publicly routable IP addresses 138A-N that correspond to the scrubbed IP domain 140. In various embodiments, the designated scrubbing point can allow (and/or establish one or more network paths so as to route) the traffic flows to the exposed application 132.

From operation 404, the method 400 may proceed to operation 406, where the designated scrubbing point can create (and/or provide traffic flow records for the creation of) an instance of the DSS 160 for the scrubbed IP domain 140. The designated scrubbing point may perform one or more operations discussed with respect to FIGS. 1A, 1B, 2, 3A, and/or 3B to facilitate creation of the DSS 160. The DSS 160 may include an instance of the scrubbing sequence 224 that so as to distribute scrubbing of probe traffic among two or more designated scrubbing points that are along a network path to the target of the traffic flow (e.g., a network path to one or more of the VMs 128A-N that are and/or will be associated with the publicly routable IP addresses 138A-N that correspond to the scrubbed IP domain 140).

From operation 406, the method 400 may proceed to operation 408, where the designated scrubbing point can withdraw exposure of the exposed application 132 from being publicly advertised to various devices (e.g., the source device 105) via an internet connection 111. For example, the designated scrubbing point can prevent advertisement of the publicly routable IP address that is used for the exposed application 132, which can cease the traffic flows to the exposed application 132 because the traffic may no longer attempt to reach the exposed application 132.

From operation 408, the method 400 may proceed to operation 410, where the designated scrubbing point can establish an instance of the scrubbed IP domain 140 by triggering implementation of the DSS 160, where implementation of the DSS 160 can initiate scrubbing of probe traffic within the SPN 114 and/or the datacenters 120A-N so as to prevent probe traffic flows from reaching the one or more VMs 128A-N that are associated with the publicly routable IP addresses 138A-N which are being targeted by the detected probe traffic. In some embodiments, the method 400 may proceed from operation 410 to operation 418, where the method 400 can end. In some embodiments, from operation 410, the method 400 may proceed to operation 412.

At operation 412, the designated scrubbing point can create another designated scrubbing point to support the scrubbing service 130 and expand protection of the scrubbed IP domain 140. For example, another designated scrubbing point can be created by an instance of the scrubbing client 152 being instantiated on a network node, computer system, and/or network function that is along a network path that handles traffic flows to the target of the traffic flow. For example, in an embodiment, the IGR 116A may operate as a designated scrubbing point of the scrubbing service 130 and can serve as a carrier-grade peering router that provides an internet connection for the SPN 114. In an embodiment, the IGR 116A can provide and/or trigger instantiation of an instance of the scrubbing client 152 on the IGR 116B, which can be configured as another carrier-grade peering router that is able to provide a network path to one or more host node associated with the scrubbed IP domain 140. The IGR 116B can reconfigure one or more filtering rules (and/or purge inactive filtering rules) so as to conform to the DSS 160 and in turn can detect instances of probe traffic that can be scrubbed to protect the scrubbed IP domain 140.

From operation 412, the method 400 may proceed to operation 414, where the designated scrubbing point can permit detected probe traffic to proceed to a next hop along a network path, such as the IGR 116A permitting an instance of the probe traffic flow 108 to be routed along the network path 156 to the AR 118B, which is another designated scrubbing point of the scrubbing service 130. The detected probe traffic may be permitted to be routed to a downstream designated scrubbing point (e.g., the AR 118B) despite the DSS 160 configuring the designated scrubbing point (e.g., the IGR 116A) to detect and recognize that the traffic flow is probe traffic that should be scrubbed. In some embodiments, the designated scrubbing device that permits the detected probe traffic to be routed to a downstream designated scrubbing point (which may be a next hop along the network path, but not necessarily) may be referred to as a first designated scrubbing point, and the other designated scrubbing point that is along the network path may be referred to as the second designated scrubbing point. In various embodiments, the detected probe traffic may be permitted to continue along the network path based on the DSS 160 providing an instance of the scrubbing sequence 224, which can monitor resources spent on scrubbing probe traffic and/or instruct a designated scrubbing point not to exceed a defined amount of resources to scrub probe traffic, and therefore identify (and/or otherwise permit) another designated scrubbing point to provide the scrubbing downstream and protect the scrubbed IP domain 140 from probe traffic. As such, the first designated scrubbing point can permit detected probe traffic to proceed along the network path to another designated scrubbing point based on the scrubbing sequence 224 of the DSS 160.

In some embodiments, from operation 414, the method 400 may proceed to operation 416, where the designated scrubbing point can reconfigure an instance of the DSS 160 as to provide an update of any new information, policies, and/or rules that can be implemented to detect probe traffic, and thus enable distributed scrubbing of probe traffic to protect the scrubbed IP domain 140.

From operation 416, the method 400 may proceed to operation 418, where the method 400 can end.

Figure 5:
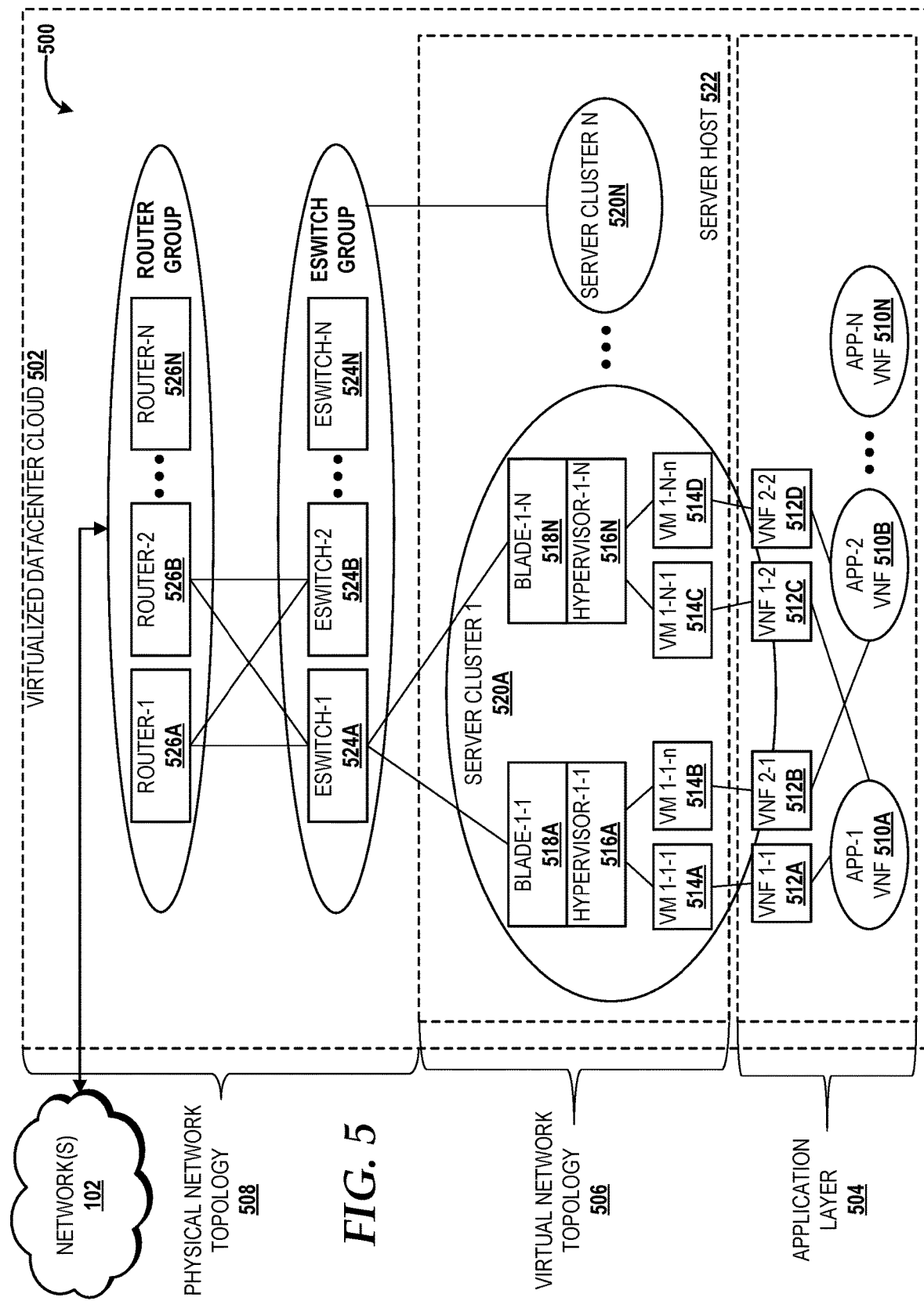
FIG. 5 is a diagram illustrating a network topology for a virtualized datacenter cloud capable of implementing aspects of the concepts and technologies described herein according embodiments of the present disclosure.

Turning now to FIG. 5, a network topology 500 for a virtualized datacenter cloud 502 will be described, according to an illustrative embodiment. In some embodiments, at least a portion of the datacenters 120A-N can be configured according to embodiments of the network topology 500. The illustrated network topology 500 includes three layers: an application ("APP") layer 504, a virtual network topology layer 506, and a physical network topology layer 508. The APP layer 504 can include one or more application virtualized network function ("VNFs") 510A-510N, each of which can be divided to one or more sub-VNFs 512A-512D (referred to herein collectively as sub-VNFs 512) to be executed by one or more VMs 514A-514D (referred to herein collectively as VMs 514), such as, in some embodiments, one or more of the virtual tenant applications 134A-N. In context of the concepts and technologies disclosed herein, the VNFs 510A-510N can include virtual processing network functions to support for one or more virtual tenant applications 134A-N of the datacenter 120A-N.

The virtual network topology layer 506 includes the VMs 514, one or more hypervisors 516, and one or more server modules ("blades") 518A-518N (referred to herein collectively as blades "518"). Each blade 518 can support one hypervisor 516A-516N (referred to herein collectively as hypervisors "516") that, in turn, can manage one or more of the VMs 514. The blades 518 provide computing capacity to support the VMs 514 carrying the sub-VNFs 512. The hypervisors 516 provide resource management among the VMs 514 supported thereby. A logical server cluster 520 is created for resource allocation and reallocation purpose, which includes the blades 518 in the same instance of the server host 522. Each instance of the server host 522 includes one or more of the logical server clusters 520.

The physical network topology layer 508 includes an Ethernet switch ("ESwitch") group, including one or more ESwitches 524A-524N (referred to herein collectively as ESwitches "524"). The physical network topology layer 508 also includes a router group, including one or more routers 526A-526N (referred to herein collectively as routers "526"). The ESwitch group provides traffic switching function among the blades 518. The router group provides connectivity for traffic routing between the virtualized datacenter cloud 502 and the network 102. The routers 526 may or may not provide multiplexing functions, depending upon network design. In some embodiments, the physical network topology layer 508 can correspond with one or more instances of the host servers 170.

The virtual network topology layer 506 is dynamic by nature, and as such, the VMs 514 can be moved among the blades 518 as needed. The physical network topology layer 508 is more static, and as such, no dynamic resource allocation is involved in this layer. Through such a network topology configuration, the association among application VNFs 510, the VM 514 supporting the application VNFs 510, and the blades 518 that hosts the VM 514 can be determined. In some embodiments, the host compute nodes 124A-N, the sandbox 133, the application server 144, and/or the cloud gateway 122 can operate within the virtual network topology layer 506.

In the illustrated example, a first VNF is divided into two sub-VNFs, VNF 1-1 512A and VNF 1-2 512C, which is executed by VM 1-1-1 514A and VM 1-N-1 514C, respectively. The VM 1-1-1 514A is hosted by the blade 1-1 518A and managed by the hypervisor 1-1 516A in the server cluster 1 520A of the server host 522. Traffic switching between the blade 1-1 518A and the blade 1-N 518N is performed via ESwitch-1 524A. Traffic communications between the ESwitches 524 and the network(s) 102 can be performed via the routers 526. In this example, the VM 1-1-1 514A can be moved from the blade 1-1 518A to the blade 1-N 518N for VM live migration if the blade 1-1 518A is detected to have difficulty to support the VNF 1-1 512A performance requirements and the blade 1-N 518N has sufficient capacity and is available to support the VNF 1-1 512A performance requirements. The virtual network topology layer 506 is dynamic by nature due to real-time resource allocation/reallocation capability of a cloud software defined network ("SDN"). The association of application, VM, and blade host in this example is the VNF 1-1 512A is executed on the VM 1-1-1 514A hosted by the blade 1-1 518A in the server cluster 1 520A. In some embodiments, the exposed application 132, the virtual tenant applications 134A-N, and/or the scrubbing client 152 can operate within or otherwise correspond with the APP layer 504.

Figure 6:
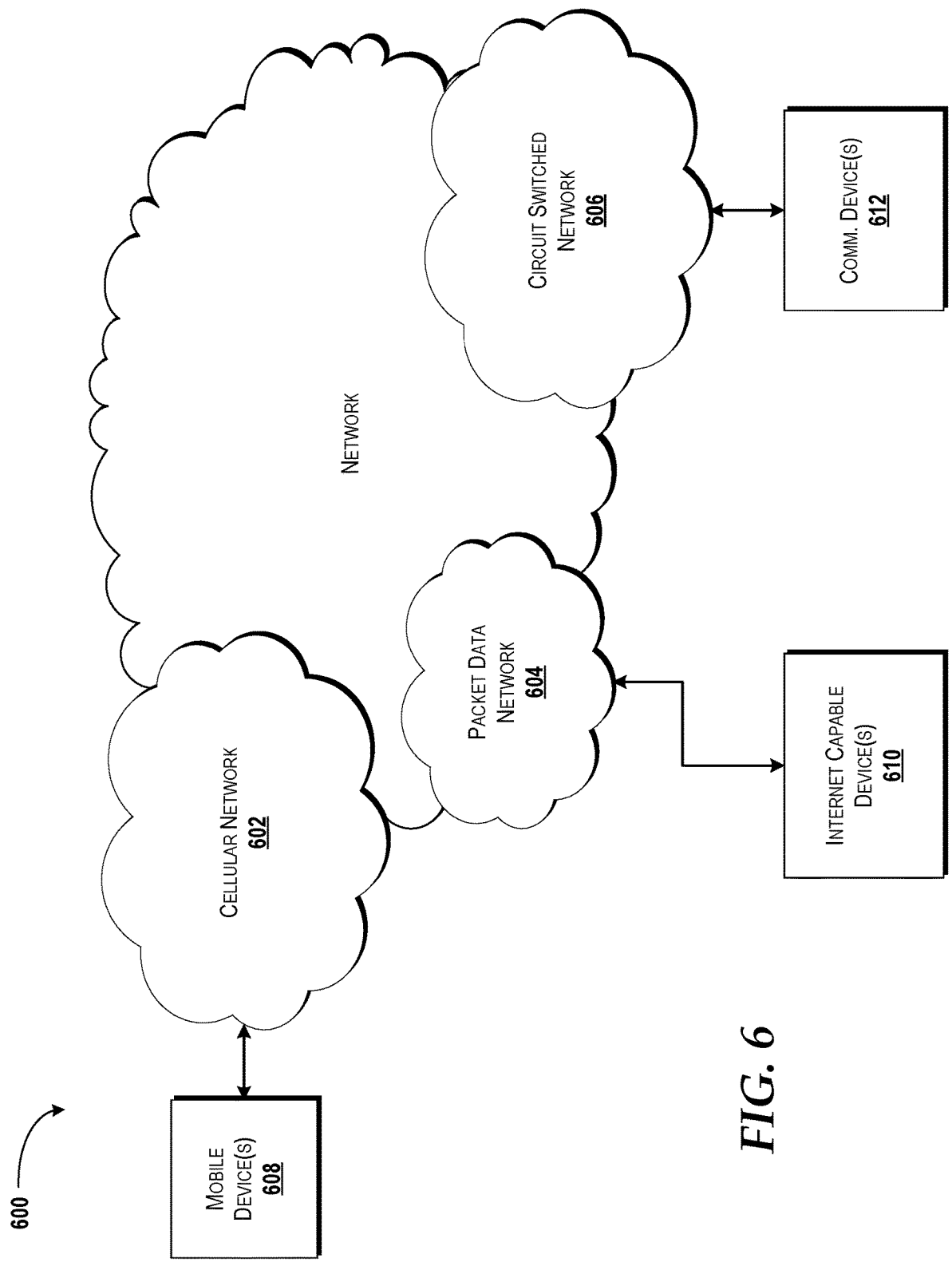
FIG. 6 is a diagram illustrating an example network capable of implementing aspects of the embodiments discussed herein.

Turning now to FIG. 6, details of a network 600 are illustrated, according to an illustrative embodiment. In some embodiments, one or more of the network 102 and/or the network 818 can be configured, at least in part, as the network 600. The network 600 includes a cellular network 602, a packet data network 604, for example, the Internet, and a circuit switched network 606, for example, a PSTN. The cellular network 602 includes various network components such as, but not limited to, base transceiver stations ("BTSs"), NBs, eNBs, gNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), optical transport devices, and the like. The cellular network 602 also includes radios and nodes for receiving and transmitting voice, data, and combinations thereof to and from radio transceivers, networks, the packet data network 604, and the circuit switched network 606. In some embodiments, the network 102 of FIG. 1A can operate, at least in part, as the packet data network 604 and/or as or in cooperation with the cellular network 602.

The mobile communications device 608, such as, for example, a cellular telephone, a mobile terminal, a PDA, a laptop computer, a handheld computer, and combinations thereof, can be operatively connected to the cellular network 602. In some embodiments, the source device 105 and/or the UE 101 can be configured as the mobile communications device 608. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G and 5G mobile communications standards such as LTE, or the like, as well as evolved and future mobile standards, including but not limited to LTE-Advanced, LTE-Advanced Pro and 5G.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (e.g., a "browser") for executing a web page in a format readable by the browser or other software such as executable applications. Other files and/or data may be accessible via "links" and/or pointers in the retrieved files, as is understood by one of skill in the technology. In some embodiments, the packet data network 604 includes or is in communication with the Internet. In some embodiments, the at least some of the network 102 can be configured as a packet data network, such as the packet data network 604. The circuit switched network 606 includes various hardware and software for providing circuit switched communications. The circuit switched network 606 may include, or may be, what is often referred to as a POTS. In some embodiments, the at least some of the network 102 also can be configured as a circuit switched network, such as the circuit switched network 606. The functionality of a circuit switched network 606 or other circuit-switched network are understood by one of skill in the technology and therefore will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. In some embodiments, the internet-capable devices 610 can include one or more client devices 10 and one or more network elements of the datacenter 110. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network of FIG. 6 is used to refer broadly to any combination of the networks 602, 604, 606 shown in FIG. 6. It should be appreciated that, in some embodiments, substantially all of the functionality described with reference to the network 102 and/or the datacenter 110 can be performed by the cellular network 602, the packet data network 604, and/or the circuit switched network 606, alone or in combination with other networks, network elements, and the like, according at least to aspects of the features and operations discussed herein.

Figure 7:
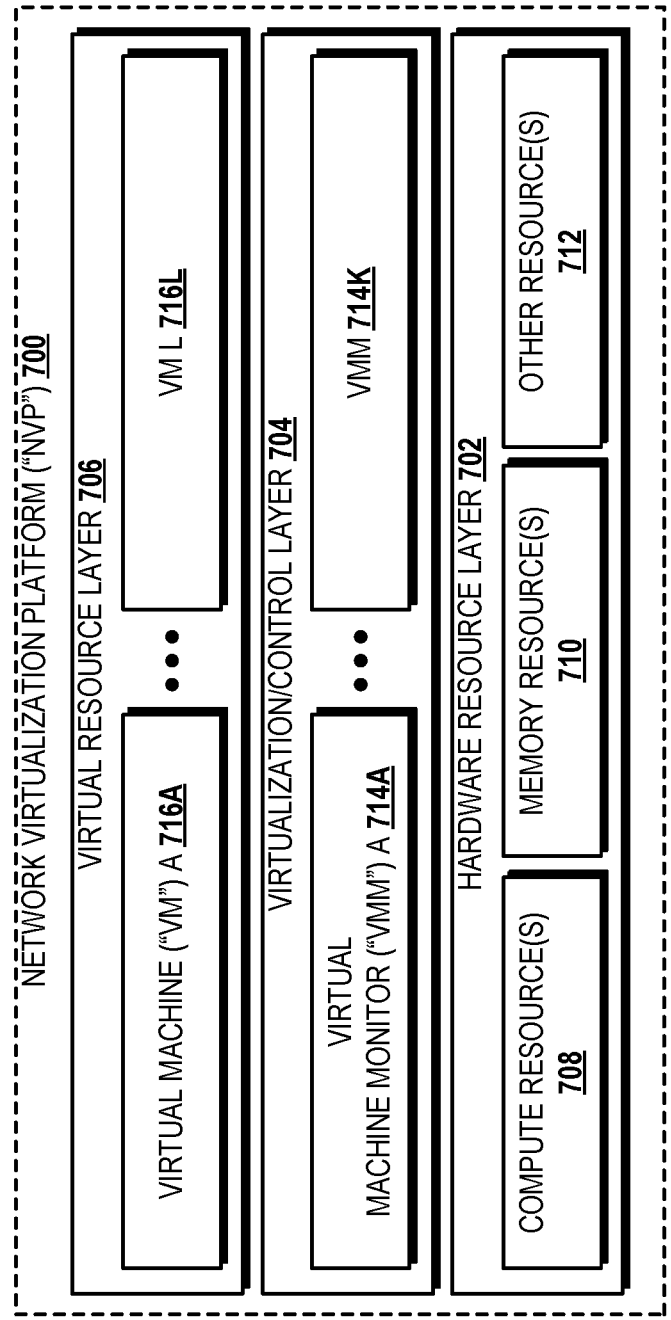
FIG. 7 is a block diagram illustrating a network virtualization platform ("NVP") capable of implementing aspects of the embodiments presented herein.

Turning now to FIG. 7, a block diagram illustrating an illustrative network virtualization platform ("NVP") 700 that can be used to implement, at least in part, the datacenters 120A-N and/or at least a portion thereof, introduced above in FIG. 1 will be described, according to an illustrative embodiment. For example, in some embodiments, the host compute nodes 124A-N, the SPN 114, the IGRs 116A-N, the ARs 118A-N, the datacenters 120A-N, the VRs 126A-N, the application server 150, and/or other network elements of the operating environment 100 and/or 100' can be implemented via the NVP 700. The illustrated NVP 700 includes a hardware resource layer 702, a virtualization/control layer 704, and a virtual resource layer 706 that work together to perform operations as will be described in detail herein. The hardware resource layer 702 provides hardware resources, which, in the illustrated embodiment, include one or more compute resources 708, one or more memory resource(s) 710, and one or more other resources 712. In some embodiments, the hardware resource layer 702 can correspond with an embodiment of the host compute nodes 124A-N of the datacenters 120A-N.

The compute resource(s) 708 can include one or more hardware components that perform computations to process data, and/or to execute computer-executable instructions of one or more application programs, operating systems, and/or other software, to provide, at least in part, any services or composition of services described herein. In some embodiments, a processor of the operating environment 100 can correspond with the compute resources 708. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resource(s) 710, and/or one or more of the other resources 712. In some embodiments, a memory of the operating environment 100 can correspond with the memory resource(s) 710. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures or combinations thereof, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resource(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714A-714K (also known as "hypervisors;" hereinafter, collectively "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706. In some embodiments, the host compute node 124A-N can provide the VMMs 714.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). It should be understood, however, that other container technologies can be used and are contemplated. It is understood that as used herein, the term "abstractions" (and variants thereof) is to be interpreted within the realm of networking and computer engineered systems, specifically as a way to describe a layered computer implementation to transform physical, non-generic devices so as to veil an end user from viewing the complexity of network architecture that is executing at lower levels, thereby enabling the transformation of particular machines and implementation of concepts and technologies discussed herein. In no manner shall the term "abstractions" (or variants thereof), be used to interpret or construe the claims in such a way as being directed to an abstract idea or any other judicial exception. In the illustrated embodiment, the virtual resource layer 706 includes VMs 716A-716L (hereinafter, collectively "VMs 716"). The VMs 716 can execute instructions to provide, at least in part, any services or composition of services described herein, such as but not limited to, the application server 144, and/or the scrubbed IP domain 140. In some embodiments, at least one or more of the virtual tenant applications 134A-N, the sandbox 133, the VMs 128A-N, and/or the VMs 130A-N can be configured to operate as one or more of the VMs 716 within the operating environment 100.

Figure 8:
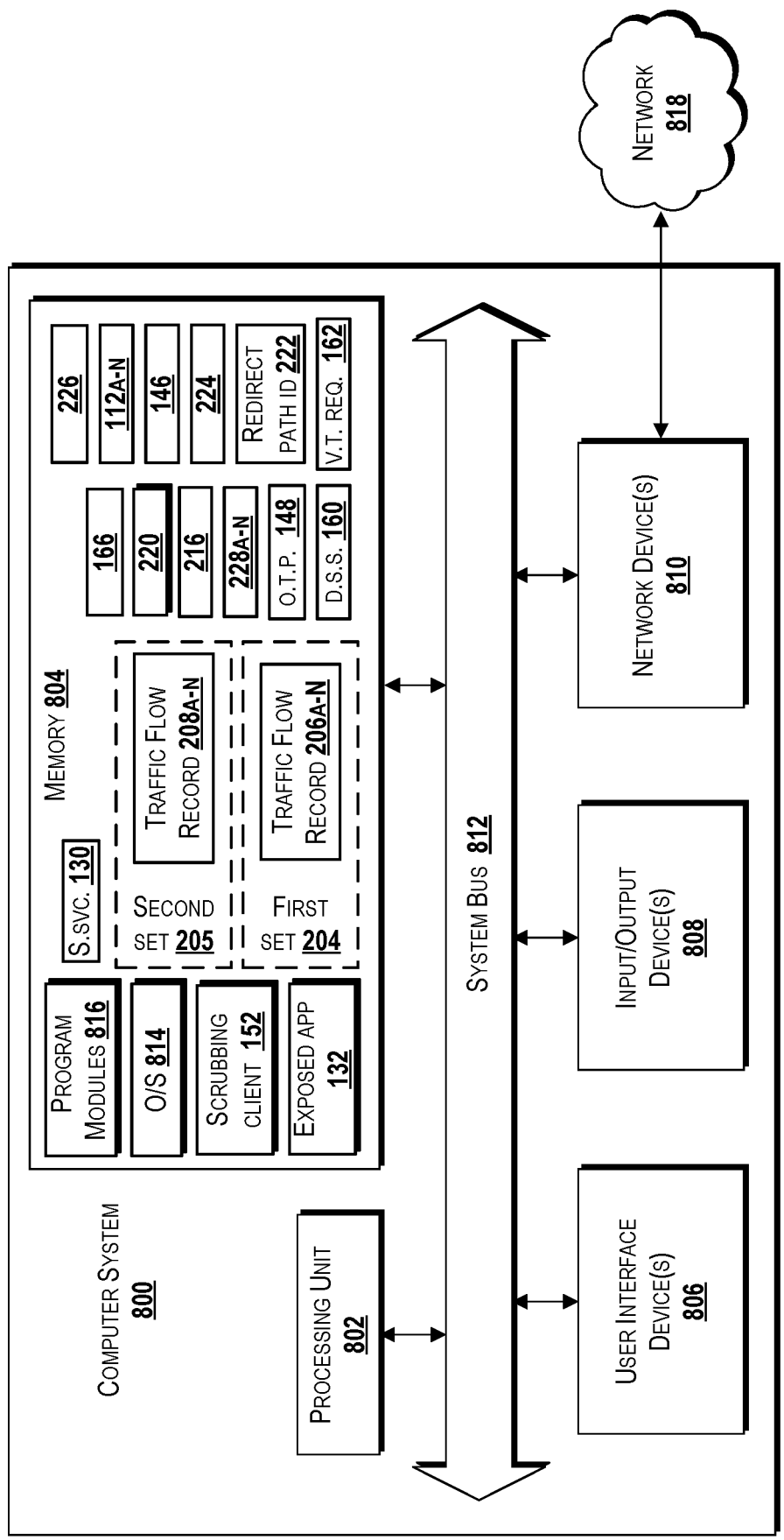
FIG. 8 is a block diagram illustrating an example computer system capable of implementing aspects of the embodiments presented and described herein.

Turning now to FIG. 8, a block diagram is provided illustrating a computer system 800 configured to provide the functionality in accordance with various embodiments of the concepts and technologies disclosed herein. The systems, devices, and other components disclosed herein can utilize, at least in part, an architecture that is the same as or at least similar to the architecture of the computer system 800. In some embodiments, one or more of the host compute nodes 124A-N of the datacenter 120A-N, the IGRs 116A-N, the ARs 118A-N, the cloud gateway 122, the application server 144, the network access point 103, and/or the UEs 101, can be configured like the computer system 800. It should be understood, however, that modification to the architecture may be made to facilitate certain interactions among elements described herein.

The computer system 800 includes a processing unit 802, a memory 804, one or more user interface devices 806, one or more input/output ("I/O") devices 808, and one or more network devices 810, each of which is operatively connected to a system bus 812. The system bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 802 can include one or more central processing units ("CPUs") configured with one or more processing cores, and/or one or more graphics processing unit ("GPU") configured to accelerate operations performed by one or more CPUs. The processing unit 802 can include one or more system-on-chip ("SoC") components along with one or more other components, including, for example, one or more of the memory resources, and/or one or more of the other resources. Processing units are understood by one of ordinary skill in the technology, and therefore are not described in further detail herein. In some embodiments, one or more instances of the processing unit 802 can be included in any component discussed with respect to FIGS. 1A, 1B, and 2. As such, one or more instances of the processing unit 802 can provide processor resources for the host compute nodes 124A-N of the datacenters 120A-N. It is understood that processors of the datacenter 120A-N can be implemented as one or more instances of processing unit 802.

The memory 804 communicates with the processing unit 802 via the system bus 812. In various embodiments, memory of the host compute nodes 124A-N, the application server 144, the SPN 114, and/or any other component discussed herein can be implemented as the memory 804. In some embodiments, the memory 804 is operatively connected to a memory controller (not shown) that enables communication with the processing unit 802 via the system bus 812. The illustrated memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules to perform the various operations described herein. In some embodiments, for example, the program modules 816 can include the scrubbing client 152, the exposed application 132, and/or other program modules. These and/or other programs can be embodied in computer-readable medium including instructions that, when executed by the processing unit 802, in some embodiments, may perform and/or facilitate performance of one or more of the operations discussed with respect to FIGS. 1A, 1B, 2, 3A, 3B, and 4 described in detail above. According to some embodiments, the program modules 816 may be embodied in hardware, software, firmware, or any combination thereof. In some embodiments, the memory 804 also can be configured to store data including, but not limited to, the dynamic traffic flows 112A-N, the configuration input 146, observation time period 148, the DSS 160, the configuration message 166, the virtual tenant request 162, the first set 204, the traffic flow records 206A-N, the second set 205, the traffic flow record 208A-N, the external source information 216, the dynamic probe traffic map 220, the isolated path identifier 222, the scrubbing sequence 224, the designated scrubbing points 226, the designated device identifiers 228A-N, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrases "memory," "computer storage medium," and variations thereof, does not include waves or signals per se and/or communication media.

The user interface devices 806 may include one or more devices with which a user accesses the computer system 800. The user interface devices 806 may include, but are not limited to, computers, servers, PDAs, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer. In some embodiments, the I/O devices 808 can be used for manual controls for operations to exercise under certain emergency situations.

The network devices 810 enable the computer system 800 to communicate with other networks or remote systems via a network 818, such as the network 102, the Tier 1 ISP network 110A-N, the SPN 114, and/or the network 600. Examples of the network devices 810 include, but are not limited to, a modem, a radio frequency ("RF") or infrared ("IR") transceiver, a telephonic interface, a bridge, a router, or a network card. The network devices 810 may support communication and functionality with the network 818, such as via physical network functions, virtual network functions, virtual and/or physical edge devices, or the like. The network devices 810 can, in some embodiments, be included in the datacenter 120A-N, such as via the host compute nodes 124A-N. The network 818 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, or additionally, the network 818 may be or may include a wired network such as, but not limited to, a Wide Area Network ("WAN"), a wired Personal Area Network ("PAN"), a wired Metropolitan Area Network ("MAN"), an optical network, a VoIP network, an IP/MPLS network, a PSTN network, an IMS network, an EPC network, or any other mobile network and/or wireline network.

Based on the foregoing, it should be appreciated that concepts and technologies directed to a scrubbed internet protocol domain for enhanced cloud security have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, operations, or mediums described herein. Rather, the specific features, operations, and mediums are disclosed as example forms of implementing the concepts and technologies disclosed herein. The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, in response to execution by the processor, cause the processor to perform operations comprising:
   assigning a publicly routable internet protocol address to an application executed by at least a portion of a computing resource of a host compute node of a datacenter to expose the application to devices external to the datacenter via an internet connection provided by a network hosted by a communications service provider, wherein the datacenter provides a plurality of virtual machines via at least the host compute node,
   monitoring traffic flows to the application during an observation time period, wherein the traffic flows include probe traffic flows that attempt to reach the application,
   generating, based on the traffic flows monitored, a distributed scrubbing scheme to construct a scrubbed internet protocol domain such that detected probe traffic flows are prevented from reaching the plurality of virtual machines provided by the datacenter, wherein the distributed scrubbing scheme designates a plurality of network devices along a network path between the network and the datacenter as scrubbing points, and instantiating, on each of the plurality of network devices designated as a scrubbing point, an instance of a scrubbing client comprising filtering rules indicating which traffic flows are permitted to be routed to a target destination and further comprising a scrubbing sequence, wherein the scrubbing sequence instructs the scrubbing points that a detected probe traffic flow is to be scrubbed from the network path at a particular scrubbing point of the scrubbing points while other scrubbing points of the scrubbing points are instructed to allow the detected probe traffic flow to be routed to a next scrubbing point.

2. The system of claim 1, wherein the scrubbing points include at least one of a carrier-grade router, an access router, a virtual router, or a cloud gateway.

3. The system of claim 1, wherein the operations further comprise instructing network devices of the network hosted by the communications service provider to automatically allow the traffic flows to be routed to the application during the observation time period.

4. The system of claim 1, wherein the operations further comprise withdrawing the application from being exposed to devices external to the datacenter via the internet connection in response to the observation time period elapsing.

5. The system of claim 1, wherein the scrubbed internet protocol domain includes a plurality of publicly routable internet protocol addresses that can be advertised via the internet connection while being protected from the detected probe traffic flows.

6. The system of claim 1, wherein the distributed scrubbing scheme further provides instructions to purge, by each scrubbing point, inactive filtering rules of the filtering rules.

7. A method comprising:
assigning, by a system executing a processor, a publicly routable internet protocol address to an application executed by at least a portion of a computing resource of a host compute node of a datacenter to expose the application to devices external to the datacenter via an internet connection provided by a network hosted by a communications service provider, wherein the datacenter provides a plurality of virtual machines via at least the host compute node:

monitoring, by the processor, traffic flows to the application during an observation time period, wherein the traffic flows include probe traffic flows that attempt to reach the application;

generating, by the processor, based on the traffic flows monitored, a distributed scrubbing scheme to construct a scrubbed internet protocol domain such that detected probe traffic flows are prevented from reaching the plurality of virtual machines provided by the datacenter, wherein the distributed scrubbing scheme designates a plurality of network devices along a network path between the network and the datacenter as scrubbing points; and instantiating, by the processor, on each of the plurality of network devices designated as a scrubbing point, an instance of a scrubbing client comprising filtering rules indicating which traffic flows are permitted to be routed to a target destination and further comprising a scrubbing sequence, wherein the scrubbing sequence instructs the scrubbing points that a detected probe traffic flow is to be scrubbed from the network path at a particular scrubbing point of the scrubbing points while other scrubbing points of the scrubbing points are instructed to allow the detected probe traffic flow to be routed to a next scrubbing point.

8. The method of claim 7, wherein the scrubbing points include at least one of a carrier-grade router, an access router, a virtual router, or a cloud gateway.

9. The method of claim 7, further comprising instructing network devices of the network hosted by the communications service provider to automatically allow the traffic flows to be routed to the application during the observation time period.

10. The method of claim 7, further comprising withdrawing, by the processor, the application from being exposed to devices external to the datacenter via the internet connection in response to the observation time period elapsing.

11. The method of claim 7, wherein the scrubbed internet protocol domain includes a plurality of publicly routable internet protocol addresses that can be advertised via the internet connection while being protected from the detected probe traffic flows.

12. The method of claim 7, further comprising wherein the distributed scrubbing scheme further provides instructions to purge, by each scrubbing point, inactive filtering rules of the filtering rules.

13. A computer storage medium having computer-executable instructions stored thereon that, in response to execution by a processor, cause the processor to perform operations comprising:

assigning a publicly routable internet protocol address to an application executed by at least a portion of a computing resource of a host compute node of a datacenter to expose the application to devices external to the datacenter via an internet connection provided by a network hosted by a communications service provider, wherein the datacenter provides a plurality of virtual machines via at least the host compute node;

monitoring traffic flows to the application during an observation time period, wherein the traffic flows include probe traffic flows that attempt to reach the application;

generating, based on the traffic flows monitored, a distributed scrubbing scheme to construct a scrubbed internet protocol domain such that detected probe traffic flows are prevented from reaching the plurality of virtual machines provided by the datacenter, wherein the distributed scrubbing scheme designates a plurality of network devices along a network path between the network and the datacenter as scrubbing points; and instantiating, on each of the plurality of network devices designated as a scrubbing point, an instance of a scrubbing client comprising filtering rules indicating which traffic flows are permitted to be routed to a target destination and further comprising a scrubbing sequence, wherein the scrubbing sequence instructs the scrubbing points that a detected probe traffic flow is to be scrubbed from the network path at a particular scrubbing point of the scrubbing points while other scrubbing points of the scrubbing points are instructed to allow the detected probe traffic flow to be routed to a next scrubbing point.

14. The computer storage medium of claim 13, wherein the scrubbing points include at least one of a carrier-grade router, an access router, a virtual router, or a cloud gateway.

15. The computer storage medium of claim 13, wherein the operations further comprise instructing network devices of the network hosted by the communications service provider to automatically allow the traffic flows to be routed to the application during the observation time period.

16. The computer storage medium of claim 13, wherein the scrubbed internet protocol domain includes a plurality of publicly routable internet protocol addresses that can be advertised via the internet connection while being protected from the detected probe traffic flows.

17. The computer storage medium of claim 13, wherein the distributed scrubbing scheme further provides instructions to purge, by each scrubbing point, inactive filtering rules of the filtering rules.

18. The computer storage medium of claim 13, wherein the operations further comprise withdrawing the application from being exposed to devices external to the datacenter via the internet connection in response to the observation time period elapsing.

* * * * *